United States Patent
Baeuerle et al.

(10) Patent No.: US 9,575,819 B2
(45) Date of Patent: Feb. 21, 2017

(54) LOCAL BUFFERS FOR EVENT HANDLERS

(71) Applicants: Stefan Baeuerle, Walldorf (DE); Timm Falter, Walldorf (DE); Daniel Hutzel, Walldorf (DE)

(72) Inventors: Stefan Baeuerle, Walldorf (DE); Timm Falter, Walldorf (DE); Daniel Hutzel, Walldorf (DE)

(73) Assignee: SAP SE, Walldorf (DE)

( * ) Notice: Subject to any disclaimer, the term of this patent is extended or adjusted under 35 U.S.C. 154(b) by 20 days.

(21) Appl. No.: 14/020,633

(22) Filed: Sep. 6, 2013

(65) Prior Publication Data

US 2015/0074685 A1    Mar. 12, 2015

(51) Int. Cl.
G06F 9/54    (2006.01)
G06F 11/07    (2006.01)

(52) U.S. Cl.
CPC .......... G06F 9/542 (2013.01); G06F 11/0793 (2013.01)

(58) Field of Classification Search
CPC ............................. G06F 9/542; G06F 11/0793
See application file for complete search history.

(56) References Cited

U.S. PATENT DOCUMENTS

| | | |
|---|---|---|
| 5,999,908 A | 12/1999 | Abelow |
| 6,038,558 A | 3/2000 | Powers et al. |
| 6,516,310 B2 | 2/2003 | Paulley |
| 6,560,598 B2 | 5/2003 | Delo et al. |
| 6,631,382 B1 | 10/2003 | Kouchi et al. |
| 6,732,084 B1 | 5/2004 | Kabra et al. |
| 6,799,184 B2 | 9/2004 | Bhatt |
| 6,836,777 B2 | 12/2004 | Holle |
| 6,898,603 B1 | 5/2005 | Petculescu et al. |
| 6,938,041 B1 | 8/2005 | Brandow et al. |
| 6,996,568 B1 | 2/2006 | Bedell et al. |
| 7,107,497 B2 | 9/2006 | McGuire et al. |
| 7,194,744 B2 | 3/2007 | Srivastava et al. |
| 7,225,197 B2 | 5/2007 | Lissar et al. |
| 7,290,181 B2 | 10/2007 | D'Angelo et al. |
| 7,305,414 B2 | 12/2007 | Manikutty et al. |
| 7,340,451 B2 | 3/2008 | Sacco |
| 7,380,169 B2 * | 5/2008 | Fossum et al. ................. 714/36 |
| 7,398,530 B1 | 7/2008 | Parla et al. |
| 7,421,448 B2 | 9/2008 | Spork |
| 7,434,230 B2 | 10/2008 | Harold et al. |

(Continued)

OTHER PUBLICATIONS

Graphics: Display Method (SAP-SERM); SAP Library—BC Data Modeler; 2004; pp. 1-5.

(Continued)

*Primary Examiner* — Charles E Anya
(74) *Attorney, Agent, or Firm* — Fountainhead Law Group PC

(57) ABSTRACT

A technique is described for generating error buffer that includes errors from both a program and event handlers called by the program. A program in an event-driven environment triggers an event. In response to the triggered event, the program calls event handlers related to the event. The event handlers are executed and error messages generated during the execution are stored in a local error buffer. Upon completion of the event handlers, the local error buffers are returned to the program and the program merges the local error buffers with an error buffer associated with the program.

20 Claims, 14 Drawing Sheets

(56) References Cited

U.S. PATENT DOCUMENTS

| | | |
|---|---|---|
| 7,481,368 B2 | 1/2009 | Wang et al. |
| 7,505,983 B2 | 3/2009 | Wildhagen et al. |
| 7,523,090 B1 | 4/2009 | Sundman et al. |
| 7,640,357 B2 | 12/2009 | Kirov et al. |
| 7,653,828 B2 | 1/2010 | Kostadinov et al. |
| 7,680,782 B2 | 3/2010 | Chen et al. |
| 7,689,612 B2 | 3/2010 | Helsen et al. |
| 7,693,819 B2 | 4/2010 | Stoychev |
| 7,761,481 B2 | 7/2010 | Guarav et al. |
| 7,765,222 B2 | 7/2010 | Styles et al. |
| 7,765,224 B2 | 7/2010 | Li et al. |
| 7,788,241 B2 | 8/2010 | Cheng et al. |
| 7,805,433 B2 | 9/2010 | Dickerman et al. |
| 7,818,754 B2 | 10/2010 | Morris et al. |
| 7,836,070 B2 | 11/2010 | Forstmann |
| 7,885,840 B2 | 2/2011 | Sadiq et al. |
| 7,895,226 B2 | 2/2011 | Koch et al. |
| 7,937,401 B2 | 5/2011 | Pasumansky et al. |
| 7,970,823 B2 | 6/2011 | Moeller et al. |
| 7,975,254 B2 | 7/2011 | Gilboa |
| 7,996,443 B2 | 8/2011 | Nori et al. |
| 8,005,850 B2 | 8/2011 | Walther et al. |
| 8,010,521 B2 | 8/2011 | Kissner et al. |
| 8,065,323 B2 | 11/2011 | Sallakonda et al. |
| 8,069,184 B2 | 11/2011 | Becker et al. |
| 8,078,643 B2 | 12/2011 | Mush et al. |
| 8,122,009 B2 | 2/2012 | Dettinger et al. |
| 8,146,103 B2 | 3/2012 | Schmidt et al. |
| 8,185,508 B2 | 5/2012 | Vemuri et al. |
| 8,191,081 B2 | 5/2012 | Schmidt et al. |
| 8,209,280 B2 | 6/2012 | Kearney et al. |
| 8,214,877 B1 | 7/2012 | Grimes et al. |
| 8,219,919 B2 | 7/2012 | Norring et al. |
| 8,250,094 B2 | 8/2012 | Skaria et al. |
| 8,255,368 B2 | 8/2012 | Cox |
| 8,281,283 B2 | 10/2012 | Speth et al. |
| 8,286,916 B2 | 10/2012 | Pauly et al. |
| 8,327,260 B2 | 12/2012 | Bays et al. |
| 8,347,207 B2 | 1/2013 | Borgsmidt et al. |
| 8,364,300 B2 | 1/2013 | Pouyez et al. |
| 8,364,724 B2 | 1/2013 | Stolte et al. |
| 8,370,400 B2 | 2/2013 | Brunswig et al. |
| 8,375,041 B2 | 2/2013 | Webster et al. |
| 8,407,215 B2 | 3/2013 | Sheedy et al. |
| 8,407,262 B2 | 3/2013 | Hsu et al. |
| 8,407,309 B1 | 3/2013 | Feldman et al. |
| 8,412,673 B2 | 4/2013 | Weissenberger et al. |
| 8,417,732 B2 | 4/2013 | Rapp |
| 8,429,176 B2 | 4/2013 | Sigurbjornsson et al. |
| 8,473,506 B2 | 6/2013 | Sedlar et al. |
| 8,478,515 B1 | 7/2013 | Foucher et al. |
| 8,484,210 B2 | 7/2013 | Loh et al. |
| 8,489,649 B2 | 7/2013 | Yalamanchi et al. |
| 8,504,522 B2 | 8/2013 | Wu et al. |
| 8,504,568 B2 | 8/2013 | Chandrasekhara et al. |
| 8,505,032 B2 | 8/2013 | Craddock et al. |
| 8,510,296 B2 | 8/2013 | Fan et al. |
| 8,515,982 B1 | 8/2013 | Hickman et al. |
| 2003/0009649 A1 | 1/2003 | Martin et al. |
| 2003/0135850 A1 | 7/2003 | Miloushev et al. |
| 2003/0145255 A1* | 7/2003 | Harty et al. ............... 714/48 |
| 2004/0122817 A1 | 6/2004 | Kaiser |
| 2005/0004904 A1 | 1/2005 | Kearney et al. |
| 2005/0010565 A1 | 1/2005 | Cushing et al. |
| 2005/0187952 A1 | 8/2005 | Werner |
| 2005/0283459 A1 | 12/2005 | MacLennan et al. |
| 2006/0195460 A1 | 8/2006 | Nori et al. |
| 2006/0195476 A1 | 8/2006 | Nori et al. |
| 2006/0224634 A1* | 10/2006 | Hahn et al. ............... 707/200 |
| 2006/0242104 A1 | 10/2006 | Ellis et al. |
| 2007/0118501 A1 | 5/2007 | Yan |
| 2007/0219976 A1 | 9/2007 | Muralidhar et al. |
| 2008/0065862 A1 | 3/2008 | Hansen et al. |
| 2008/0071799 A1 | 3/2008 | Evans et al. |
| 2008/0091691 A1 | 4/2008 | Tsuji |
| 2008/0120604 A1 | 5/2008 | Morris |
| 2008/0133530 A1 | 6/2008 | Wang et al. |
| 2008/0301168 A1 | 12/2008 | Adler et al. |
| 2009/0292730 A1 | 11/2009 | Li et al. |
| 2010/0114935 A1 | 5/2010 | Polo-Malouvier et al. |
| 2010/0131568 A1 | 5/2010 | Weinberg et al. |
| 2010/0241637 A1 | 9/2010 | Kissner et al. |
| 2010/0318499 A1 | 12/2010 | Arasu et al. |
| 2011/0154226 A1 | 6/2011 | Guertler et al. |
| 2011/0161371 A1 | 6/2011 | Thomson et al. |
| 2011/0225176 A1 | 9/2011 | Siegel et al. |
| 2012/0054142 A1 | 3/2012 | Du et al. |
| 2012/0109661 A1 | 5/2012 | Lueckhoff |
| 2012/0130942 A1 | 5/2012 | Dipper et al. |
| 2012/0131392 A1* | 5/2012 | Bendig ............... 714/48 |
| 2012/0215768 A1 | 8/2012 | Zellweger |
| 2012/0239987 A1* | 9/2012 | Chow et al. ............... 714/49 |
| 2013/0110879 A1 | 5/2013 | Winternitz et al. |
| 2013/0111310 A1 | 5/2013 | deOliveira et al. |
| 2013/0117346 A1 | 5/2013 | Figus |
| 2013/0151560 A1 | 6/2013 | Zurek |
| 2013/0159354 A1 | 6/2013 | Heinzl et al. |
| 2013/0166602 A1 | 6/2013 | Brunswig et al. |
| 2013/0246355 A1* | 9/2013 | Nelson et al. ............... 707/625 |
| 2014/0245079 A1* | 8/2014 | Larson et al. ............... 714/48 |
| 2014/0258777 A1* | 9/2014 | Cheriton ............... 714/19 |

OTHER PUBLICATIONS

Abovesoft Utilities; www.AboveSoft.com; Sep. 2010; pp. 1-6.
Ayers, Lonnie, PMP; SAP BW Data Modeling; SAP-BW Consulting, Inc.; pp. 1-18, printed on Aug. 29, 2013.
Heilman, Rich, HANA Product Management, SAP Labs LLC; Steyn, Werner, Customer Solution Adoption, SAP Labs, LLC; SAP HANA SQL Script Basics & Troubleshooting; Oct. 2012; pp. 1-47.
Pattern: "Fill Transient Attributes of Persistent Nodes"; SAP; Jul. 6, 2013; p. 1.

* cited by examiner understanding of the present invention. It will be evident, however, to one skilled in the art that the present invention as defined by the claims may include some or all of the features in these examples alone or in combination with other features described below, and may further include modifications and equivalents of the features and concepts described herein.

LOCAL BUFFERS FOR EVENT HANDLERS

BACKGROUND

An application is run on a processor for the purpose of performing one or more tasks on a system. The application, which is made up of computer code, contains application logic that dictates how the system processes different inputs in different scenarios. Errors that are generated during execution of the computer program are stored in an error buffer and subsequently reported to the user.

A computer program can be modularized and event-driven by implementing the application logic using events and event handlers. An event is an input (e.g., a user action or system occurrence) that can be detected by the computer program. Exemplary events include pressing a button on a mouse, pressing a key on a keyboard, or a threshold being reached. When an event is triggered (also known as raising an event), event handlers related to the event are called to process the event. However, errors that are generated during execution of an event handler have no way of being stored in the error buffer since there is no communication channel from the event handler back to the application. As a result, the application's error buffer does not provide a full representation of the errors that occurred during execution of the application.

SUMMARY

Embodiments of the present invention relate to improved techniques for navigating between pages of content. In one embodiment a method is described for improving the user experience when switching between content oriented pages. The content oriented pages can be pages of content in a content oriented application or alternatively web pages that belong to a web site. The method can be a computer implemented method, possibly stored in non-transitory computer readable storage medium. In one embodiment, the method includes presenting, on a display, a first page of digital content having an active state set to a reading state, receiving a request to display a second page of digital content, setting the active state of the first page of digital content to a retiring state based on the request, receiving the second page of digital content, determining that the second page of digital content is ready for presentation, and presenting, on the display, the second page of digital content based on the determination, wherein a navigational link on the first page of digital content is enabled when the active state is set to the reading state, and wherein the navigational link on the first page of digital content is disabled when the active state is set to the retiring state.

In one embodiment, the active state of the first page is set to the retiring state when it is determined that the load time for the second page of digital content is greater than a predefined period of time.

In another embodiment, the method further includes presenting, on the display, an advertisement when the active state of the first page of digital content is set to the retiring state.

In another embodiment, presenting the second page of digital content includes setting the active state of the first page to a transacting state, wherein the first page of digital content is modified to include a visual notification that the second page is ready for presentation when the active state of the first page is set to the transacting state, determining that the active state of the first page has been set to the transacting state for a predefined period of time without detecting a termination request, and swapping the first page of digital content with the second page of digital content based on the determination.

In another embodiment, the visual indicator disappears in proportion to the expiration of the predefined period of time.

In another embodiment, the second page of digital content includes content and images, wherein the second page is ready for presentation when the content has been received irrespective of the images.

In another embodiment, the first page of digital content is modified to include a status indicator to illustrate the progress of receiving the second page of digital content.

The following detailed description and accompanying drawings provide a better understanding of the nature and advantages of the present invention.

DETAILED DESCRIPTION

Described herein are techniques for proving a local buffer to an event handler. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

A system is described for reporting back to an application data generated from an event handler. The event handler is described as containing a local buffer. Based on implementation details, the local buffer can store error messages, log messages, output, or other data generated during execution of the event handler. When execution of the event handler has completed, the local buffer can be merged with the application's buffer that is storing similar data generated during execution of the application. In this manner, the application's buffer can provide an accurate representation of output generated during execution of the application.

The first part of the detailed description describes the use of local buffers in event handlers. The second part of the detailed description describes a scenario where a constraint is defined in a host language as an event handler. The event handler is registered to a built-in event belonging to an entity in an entity relationship model (ERM). In this scenario, errors that are generated during processing of a constraint can be stored in the local buffer of the event handler and passed back to the application. The third part of the detailed description describes an exemplary extended data model that accommodates ERMs.

Local Buffers in Event Handlers

Figure 11:
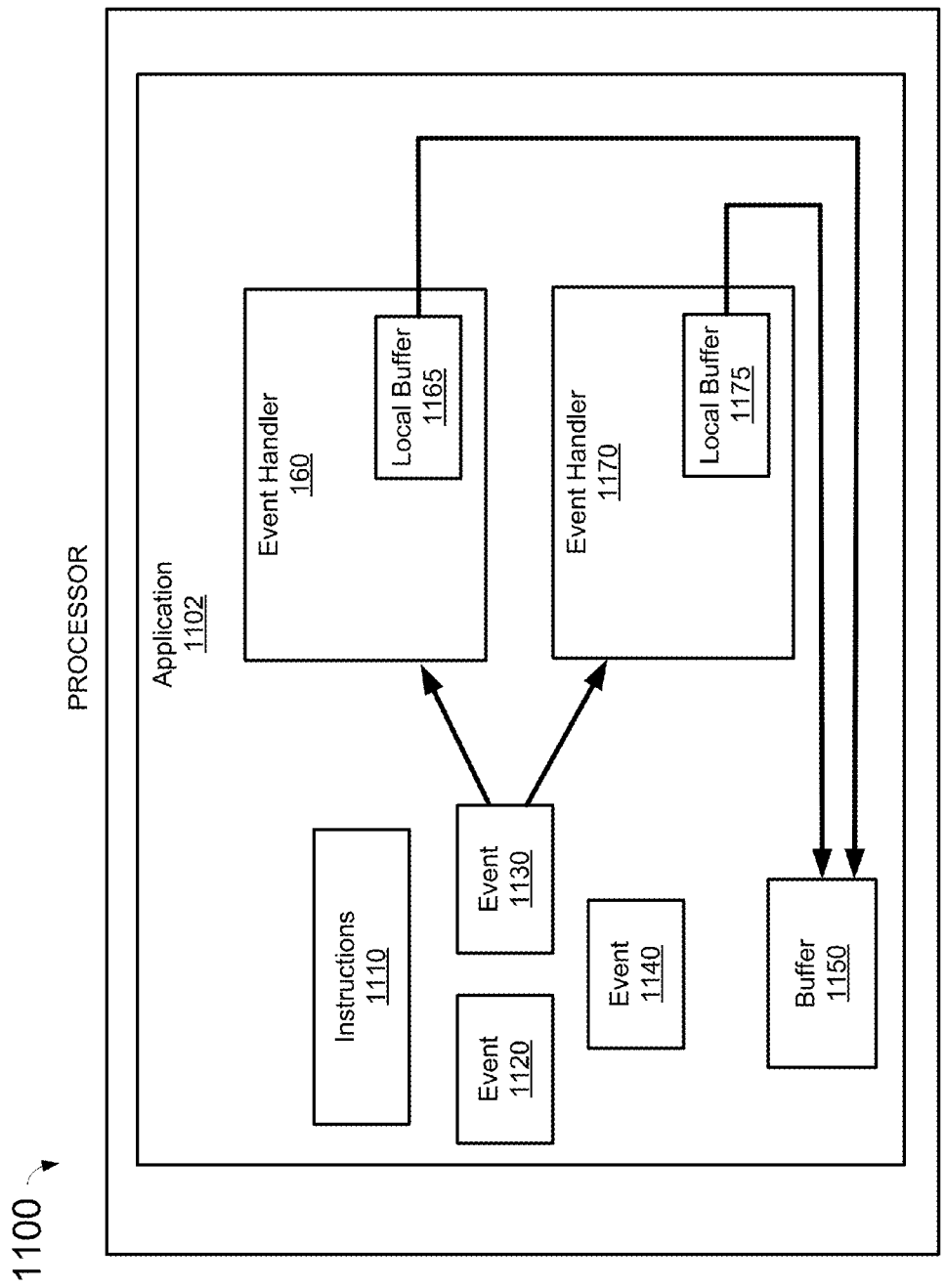
FIG. 11 illustrates a processor according to an embodiment.

FIG. 11 illustrates a processor according to an embodiment. Processor 1100 is configured to execute application 1102 for the purpose of performing one or more tasks. Application 1102 includes instructions 1110 and buffer 1150. During execution of application 1102, processor 1100 processes instructions 1110 to perform actions, which can lead to data being stored in buffer 1150. Depending on implementation details, buffer 1150 can store error messages, log messages, output, or other data that is generated during execution of instructions 1110. In this example, buffer 150 stores log messages generated during execution of instructions 1110.

Application 1102 further includes event 1120, event 1130, and event 1140. Each event can be triggered (or raised) due to a system occurrence or a user action. When an event is triggered, application 1102 can call on one or more event handlers which are registered to the event. The one or more event handlers are executed in response to the raised event. Here, event handler 1160 and event handler 1170 are registered to event 1130. When event 1130 is raised during execution of instructions 1110, application 1102 calls on event handlers 1160 and 1170 to be executed. Thus, control of application 1102 is passed to the event handlers. The event handlers can be executed in sequence or in parallel depending on the resources of processor 1100. In a multi-threaded environment, each event handler can be run in its own thread. As a result, there is no predefined order in which the related event handlers are processed or that results will be generated.

Each event handler includes a local buffer. For example, event handler 1160 includes local buffer 1165. Local buffer 1165 can be configured to store data generated during execution of event handler 1160. Examples of the data stored in buffer 1165 include error messages, log messages, output, or other data that is generated during execution of program 1110. In one example, local buffer 1165 can be configured to store the same type of data as stored in buffer 1150. For instance, local buffer 1165 and buffer 1150 can both be configured to store log messages. Similar to event handler 1160, event handler 1170 also includes local buffer 1175. In some examples, local buffer 1165, local buffer 1175, and buffer 1150 are configured to store the same type of data that is generated during execution of event handler 1160, event handler 1170, and instructions 1110, respectively.

Once event handlers 1160 and 1170 have completed execution, each event handler can be synchronized with application 1102. During synchronization, buffer 1150 can receive local buffers of the event handlers. Once the local buffers have been received, they can be merged with buffer 1150. As a result, the data generated by the event handlers can be combined with the data generated from execution of instructions 1110. In this example, buffer 1150 (which contains the log messages generated from instructions 1110) merges local buffers 1165 and 1175 (which contains the log messages generated from event handlers 1160 and 1170, respectively) into buffer 1150 upon completed execution of the event handlers. Once synchronization has been completed, control of program 1102 resumes its processing of instructions 1110.

Figure 12:
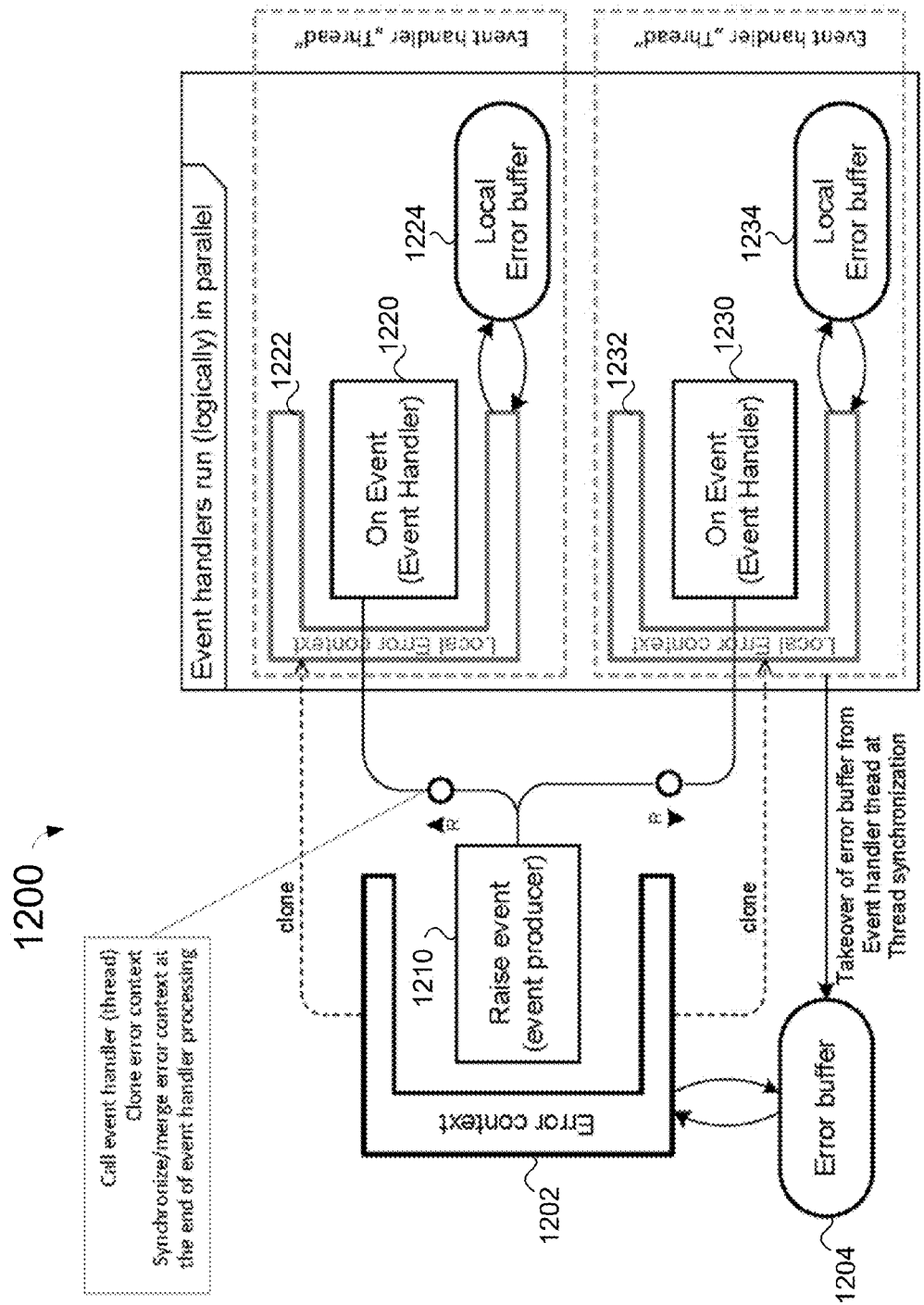
FIG. 12 illustrates an entity according to an embodiment.

FIG. 12 illustrates an entity according to an embodiment. An entity is the building block of an entity-relationship model ("ERM") in standard SQL. The entity can be implemented in Report Definition Language ("RDL"), Data Definition Language ("DDL"), or other language. Entity 1200 can include built-in events that are registered to programmatic event handlers. Raising one of the built-in events (i.e., meeting a condition of the event) pauses processing of entity 1200 as the registered event handlers are called. When the event handlers have finished processing, the raised event concludes and the processing of entity 1200 resumes. An exemplary entity titled salesOrder is given below. The entity includes an event titled on Validate.

```
entity salesOrder {
    event onValidate {
        //serialized representation of an entity could also be "this"
        element source : serializedData;
    }
}
```

Entity 1200 includes error buffer 1204. An error buffer is a container configured to store error messages generated by an entity. The error messages can be generated during processing of entity 1200. Entity 1200 also includes error context 1202 which contains the APIs for generating the error messages. An exemplary error context is given below. The error context includes actions "addMessage," "getMessages," and "hasErrors." When an error occurs in entity 1200, error context 1202 can be utilized to transform a detected error into an error message. The generated error message can be pushed into error buffer 1204.

```
context system {
    Type message {
        Id : string;
        Identifier : string;
        Severity : enum { 'W', 'E' };
        Data : serializedString; // this is containing the application
            data
    }
    Context messages {
        Action addMessage( aMessage : system.message ) { }
        Action getMessages( ) : system.messages[ ] { };
        Action hasErrors( ) : Boolean { };
    }
}
```

An example of generating an error message and pushing the error message into the error buffer is given below. As shown here, the system includes an error buffer titled "messages." When an error occurs, a variable "soemError" is created and attributes of the error are set in the variable. For instance, the severity, identifier, and data are all set in variable "soemError." In one example a record can be serialized prior to being set on the variable "soemError." Once the error is represented by the variable, the variable is added into the error buffer "messages." In other examples, error context 1202 and error buffer 1204 can be configured to store other types of messages, such as output messages or log messages.

```
var soemError : system.message = { };
soemError.severity = severity.error;
soemError.identifier = 'mySpecialError';
soemError.data = serialize( data );
system.messages.addMessage(soemError);
```

Here, entity 1200 raises event 1210. In one example, event 1210 is raised when an input associated with event 1210 is triggered (or detected). For instance, event 1210 can be raised when a request to validate entity 200 is detected. When event 1210 is raised, registered event handlers 1220 and 1230 are called. In some examples, execution of event handler 1220 and event handler 1230 can occur independent of one another and logically (or physically) processed in parallel. In other examples, each event handler, when executed, can be launched in an independent thread.

Each event handler includes a local error context for providing the APIs to generate error messages and a local error buffer for storing generated error messages. Here, event handler 1220 includes local error context 1222 and local error buffer 1224 while event handler 1230 includes local error context 1232 and local error buffer 1234. Each event handler goes through an initialization process when the event handler is called. The initialization process can be configured to initialize the local error context, the local error buffer, or both. In one embodiment, local error context 1222 of event handler 1220 can be initialized by cloning error context 1202. Cloning can include copying error context 1202 over to local error context 1222 or alternatively, overriding local error context 1222 with error context 1202. By cloning error context 1202 over to local error context 1222, the APIs of the entity 1200 can also be provided to event handler 1220. As a result, error messages pushed into local error buffer 1224 have the same style and format as error messages pushed into error buffer 1204. The consistency in the presentation of the error message is useful when combining error buffers. An exemplary event handler is given below. As shown, the event handler is related to the event onValidate and includes a set of commands that are to be executed when the event is raised.

```
On event e : onValidate as validateAmount {
  Let so : salesOrder = deserialize( e.source );
  if so.amount.value != 0 {
    if !exists( so.amount.currency ) {
      // populate the error to the buffer as channel to communicate
      violations
      Let constraintError : system.message = { };
      constraintError.severity = severity.error;
      constraintError.identifier = 'validateAmount';
      constraintError.data = serialize( so );  // or just passing
      e.source
      system.messages.addMessage( constraintError );
    }
  }
}
```

Depending on the implementation details, the local error buffer of the event handler can be initialized in different ways. In one embodiment, the initialization process can include clearing the local error buffer. A local error buffer can be reset or cleared prior to execution of the event handler. During execution of the event handler, error messages can be generated and stored in its respective local error buffer. Upon completion of event handler 1220, respective local error buffer 1224 can be passed from event handler 1220 to error buffer 1204 for synchronization. In the scenario where multiple event handlers are running in parallel (possibly on multiple independent threads), the local error buffer for each respective event handler can be received by error buffer 1204 and synchronized. Synchronization with error buffer 1204 can include adding or merging the error messages from the local error buffers into error buffer 1204. In one example, the error messages in the local error buffers can be consolidated into error buffer 1204. The technique for adding, merging, or consolidating the error messages can be based off of known techniques in the art.

In another embodiment, the initialization process can include cloning error buffer 1204 into local error buffers 1224 and 1234. This can include copying or overriding the local error buffers 1224 and 1234 with error buffer 1204. Cloning the error buffer from the entity can serve many purposes. For example, initializing local error buffer 1224 with error buffer 204 can assist the event handler in preventing duplicate error messages from being generated and stored in the local error buffers. Before an error message is stored, the error message can be compared against existing error messages in local error buffer 1224 to determine whether the error message is a duplicate of an existing message. If the error message is a duplicate, it can be discarded rather than pushed into local error buffer 1224. This can simplify the synchronization process since fewer error messages will be present in the local error buffers.

In another example, initializing local error buffer 1224 with error buffer 1204 can provide useful metadata from entity 1200 to event handler 1220. For instance, variables and values can be passed to event handler 1220 from entity 1200 by cloning error buffer 1204 into local error buffer 1224. The information provided can be useful during processing of event handler 1220. For instance, event handler 1220 can determine the state of entity 1200 by evaluating the data cloned into local error buffer 1224. The error messages in the local error buffer 1224 can also be scraped for metadata to be used in the processing of event handler 1220 or to generate error messages.

In yet another example, initializing local error buffer 1224 with error buffer 1204 can be useful when synchronizing the local error buffers after the respective event handlers have completed execution. Each event handler can run in parallel and add to or alter the error messages stored in their respective local error buffers. By generating an initial state that is shared across the local error buffers, error messages generated or modified by a particular error handler can be easily identified. If two event handlers modify the same error message, the changes can be combined during the synchronization process.

Once event handlers 1220 and 1230 have finished execution, local error buffer 1224 and 1234 can be synced with error buffer 1204. Synchronization can occur once all the called event handlers have returned. By synchronizing error buffer 1204 after the completion of all the called event handlers, conflicts that exist within different local error buffers can be resolved at one time. For instance if local error buffer 1224 includes a first version of an error message and local error buffer 1234 includes a second version of the same error message, the conflict can be resolved if both versions are evaluated before being entered into error buffer 1204. In contrast if the first version of the error message is committed into error buffer 1204 before the second version, the first version may have priority over the second version. Upon completion of processing entity 1200, error buffer 1204 can be output to the user for analysis.

Figure 13:
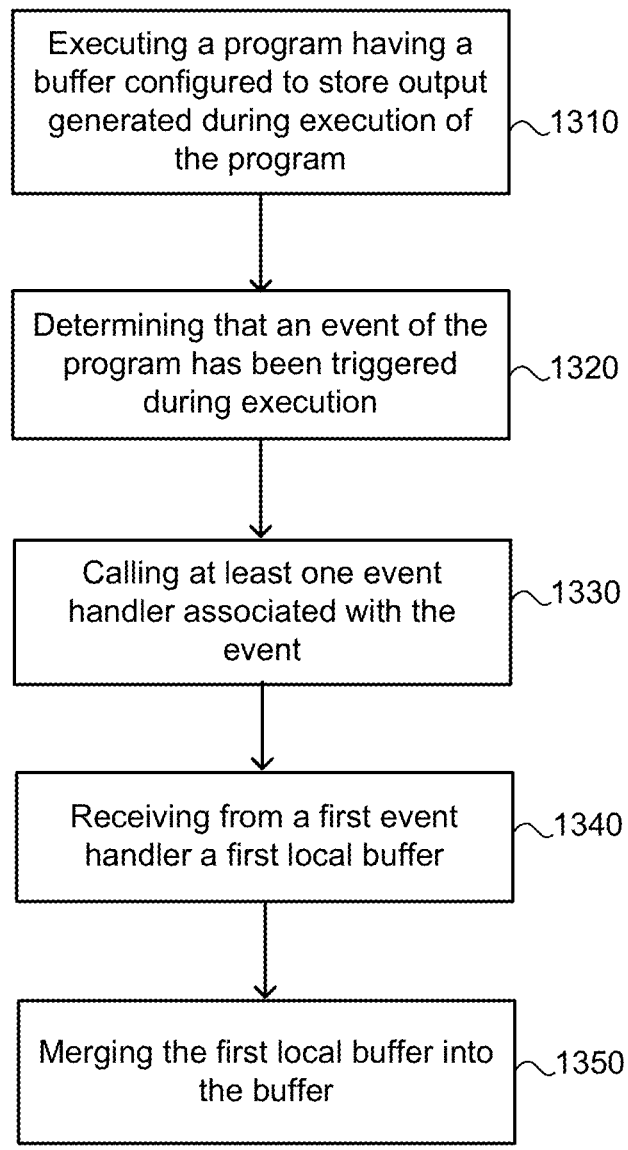
FIG. 13 illustrates a method for processing a program according to an embodiment.

FIG. 13 illustrates a method for processing a program according to an embodiment. Process 1300 can be performed by a device such as processor 1100 as described in FIG. 11. In one example, process 1300 can be stored in memory, possibly as part of application 1102 of FIG. 11. Process 1300 describes one example of how an event based application can be executed in a processor according to one embodiment. Process 1300 can begin by executing a program having a buffer configured to store output generated during execution of the program at 1310. In some examples, the output can be error messages or log messages. During execution of the program, process 1300 determines that an event of the program has been triggered at 1320. Triggering the event can include detecting a system occurrence or user input. In response to the determination process 1300 calls at least one event handler associated with the event at 1330. If there are multiple event handlers associated with the event, they can be executed in parallel in independent threads of the processor. Process 1300 receives from a first event handler a first local buffer at 1340 and merges the first local buffer into the buffer of the program at 1350. In some examples, process 1300 can wait for all the called event handlers to return with their respective local buffers before merging. Thus, all the local buffers can be merged into the buffer in one pass. This can resolve conflicts that arise from local error buffers storing conflicting output.

Figure 14:
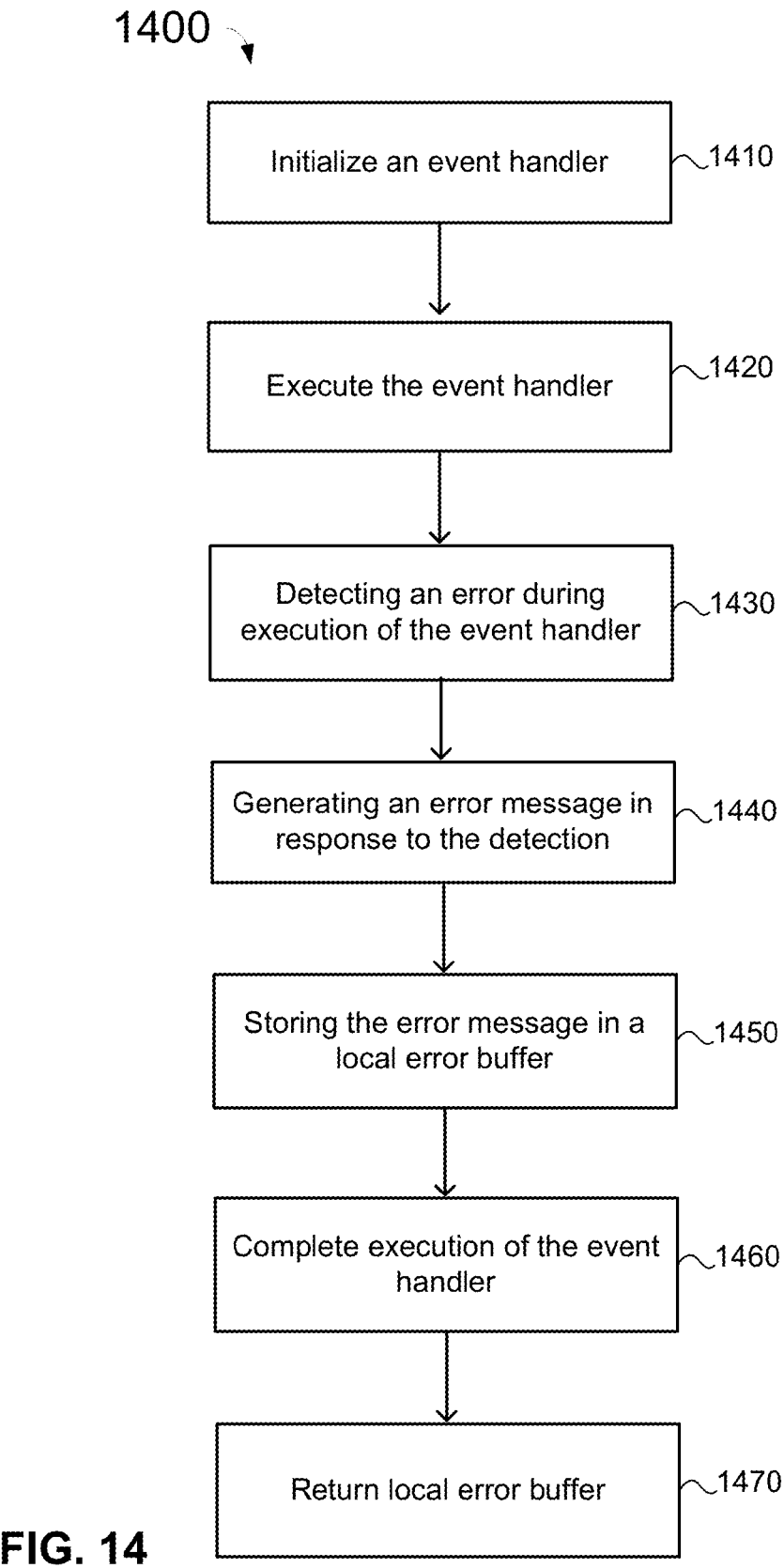
FIG. 14 illustrates a method for processing an event handler according to an embodiment.

FIG. 14 illustrates a method for processing an event handler according to an embodiment. Process 1400, which can be performed by a device such as processor 1100 of FIG. 11, can be performed in response to a request to call an event handler. Process 1400 begins by initializing the event handler at 1410. Initializing the event handler can include cloning the error context from the calling program and/or cloning the error buffer from the calling program. Initializing the event handler can also include clearing the local error buffer. Once the event handler has been initialized, the event handler can be executed at 1420. Execution of the event handler can include executing one or more commands that are associated with the event handler. During execution of the event handler, an error is detected at 1430. In response to the detection, process 1400 generates an error message at 1440. Generating the error message can include creating an error message based on the error and the local error context. For example, the local error context can provide the APIs for creating the error message. Process 1400 then stores the error message in a local error buffer at 1450 and continues executing the event handler. Upon completing execution of the event handler at 1460, the local error buffer is returned to the calling program at 1470.

Constraints in the Host Language as an Event Handler

According to embodiments, a developer can express a constraint as an event handler in a host language. The event handler can include code that defines the constraint and identifies a built-in event that triggers the event handler. When a database object (such as an entity) is created, it is instantiated with various built-in events. The built-in events can include saving the object, creating the object, deleting the object, validating the object, and modifying the object. An event handler can be registered to any one of these built-in events such that triggering the built-in event calls the event handler. This allows the event handler, which represents the constraint, to be applied in a variety of situations.

Expressing the constraint on a higher level (e.g., application level) than the database table has many advantages. First, the constraint can be easier for an application developer to create. Second, the constraint can applied not only when the database is modified (e.g., inserted, updated, or deleted) but also through explicit calls in the application code. This can provide upfront data validation that notifies a user of potential violations that may result from modifying the database without changing the persistency of the database. Third, constraints generated in the host language are compatible with constraints generated in other levels such as the data model or the database table. Thus, constraints from different levels can be applied simultaneously.

An example of different categories of constraints that can be defined on the data model is given below. Typically, basic and simple constraints can be defined on the database table or as part of the data model while complex constraints can be defined using coding in the host language.

| Category | Examples |
| --- | --- |
| Basic | NOT NULL<br>　　Key fields of entities<br>　　　　SalesOrder → Customer ID must be there<br>NOT INITIAL (MANDATORY)<br>　　Last Change Date must be set (no blank field) |
| Simple | Enum checks (field value part of enum (incl. extensions))<br>→ Relevance for LLVM/HANA Engine and possible benefits due to compiling → no dictionary lookup<br>Which ENUMS → stable lists → not too many values |
| Foreign key existence checks (associations? Compositions!) | → Difference between Associations/Compositions → Severity of check<br>SalesOrder has to have at least one item (associated entity (composition)) → Cardinality check |
| Dependent values or value domains | Amount has to have a currency if the amount value is not initial<br>Currency to be checked against the allowed currencies (value domain)<br>　　Currencies that are set via configuration as allowed currencies<br>Some product is only allowed to be shipped into defined countries (e.g. guns not into near-east)<br>　　salesOrder.Product.allowedShipmentCountries ¯=<br>　　salesOrder.deliverAdress.country |
| Field dependencies (values of one field depend on values of other fields) | German address (country code = DE), the postal code has to be set (NOT INITIAL), for US address (country code = US), the zipcode has to be set (NOT INITIAL) |
| Application Constraints | SalesOrder.Customer has to exist (existence check on customer ID) and customer has to have status „released"<br>To allow shopping on invoice, a customer has to have at least one |

| Category | Examples |
|---|---|
| | other order where he paid<br>Discount 10% only allowed if order volume >500$ (configurable) and<br>customer has A-Rating, else only 5% discount |

Figure 8:
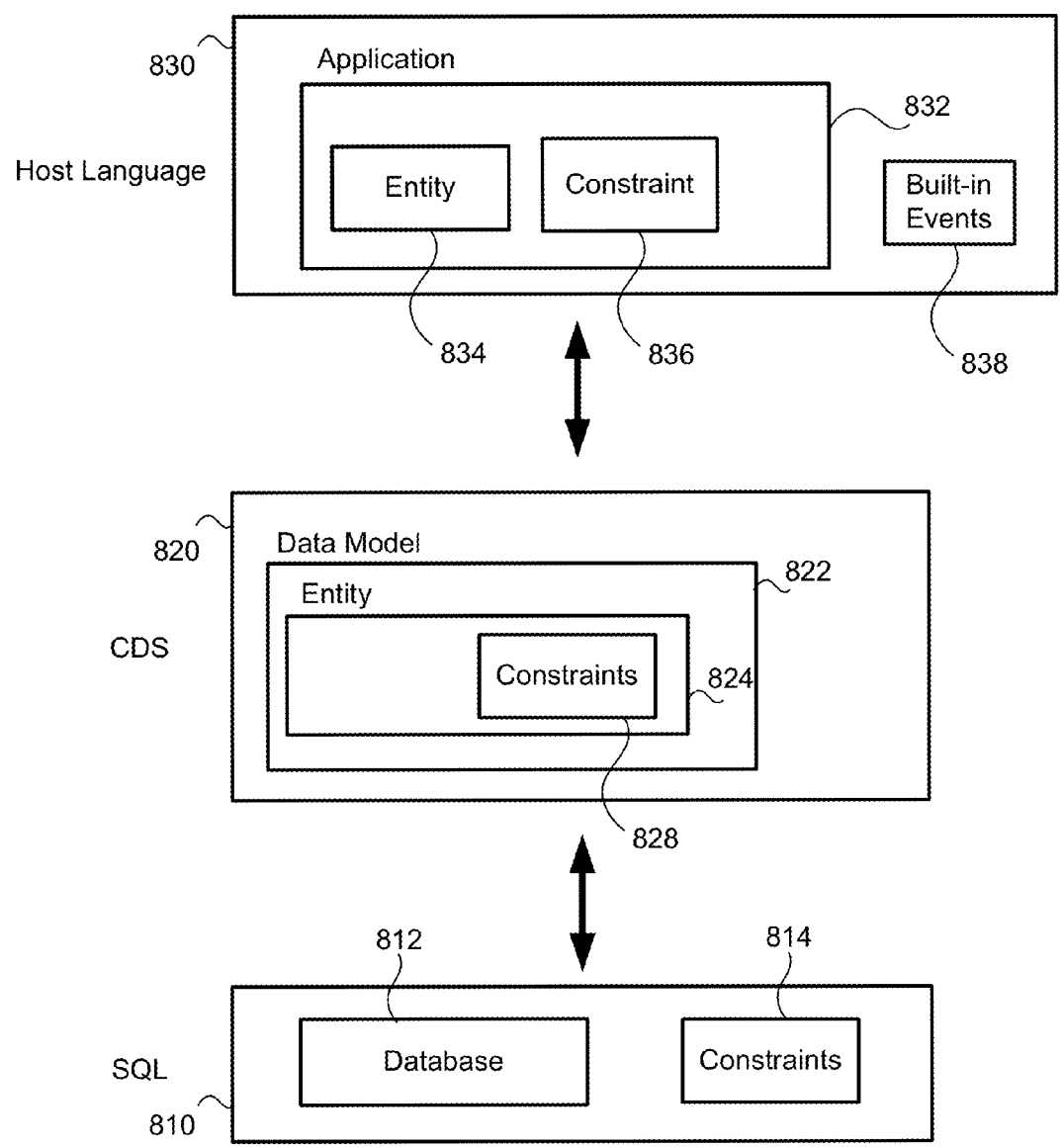
FIG. 8 illustrates a simplified view of a database structure according to one embodiment.

FIG. 8 illustrates a simplified view of a database structure according to one embodiment. Database structure 800 includes three layers—SQL layer 810, core data services (CDS) layer 820, and host language layer 830. SQL layer 810 can contain database 812. Database 812 can be a relational database that stores the data in relational tables. SQL layer 810 can also include database constraints 814. Constraints 814 maintain the consistency and integrity of database 812 by monitoring changes to database 812.

Above SQL layer 810 is CDS layer 820. CDS layer 820 is configured to create data model 822 which is configured to provide structure to database 812. In one example, CDS layer 820 can communicate with SQL layer 810 by performing queries for data to generate data model 822. Data model 822 is an entity relationship model that includes entity 824. Entity 824 further includes constraints 828 that are configured to validate data changes to entity 824.

Above CDS layer 820 is host language layer 830. Host language layer 830 includes application 832 written in the host language. Application 832 manipulates entities in data model 822, which in turn manipulates relational tables in database 812. Application 832 includes entity 834. Entity 834 can be defined in application 832 and be derived from entity 824. The host language layer 830 can automatically generate built-in events 838 when an entity is created in application 832. Built-in events 838 can be triggered by changes to the persistency of the entity. Application 832 further includes constraint 836. Constraint 836 can be defined using the host language. In one example, constraint 836 can be associated with entity 834 such that changes to entity 834 can trigger constraint 836. When entity 834 is modified, the changes can be passed down until they reach database 812. By allowing constraints to be defined in the host language, developers more familiar with the host language can create constraints that are easier to comprehend than if they were created in SQL layer 810 or CDS layer 820. In one example, constraint 836 can be attached to an event handler and registered to a built-in event of entity 834 so that the constraint is performed when the built-in event is triggered. In other embodiments, the built-in events can be generated in layers other than the host language layer.

Defining a Constraint in an Event Handler

Figure 9:
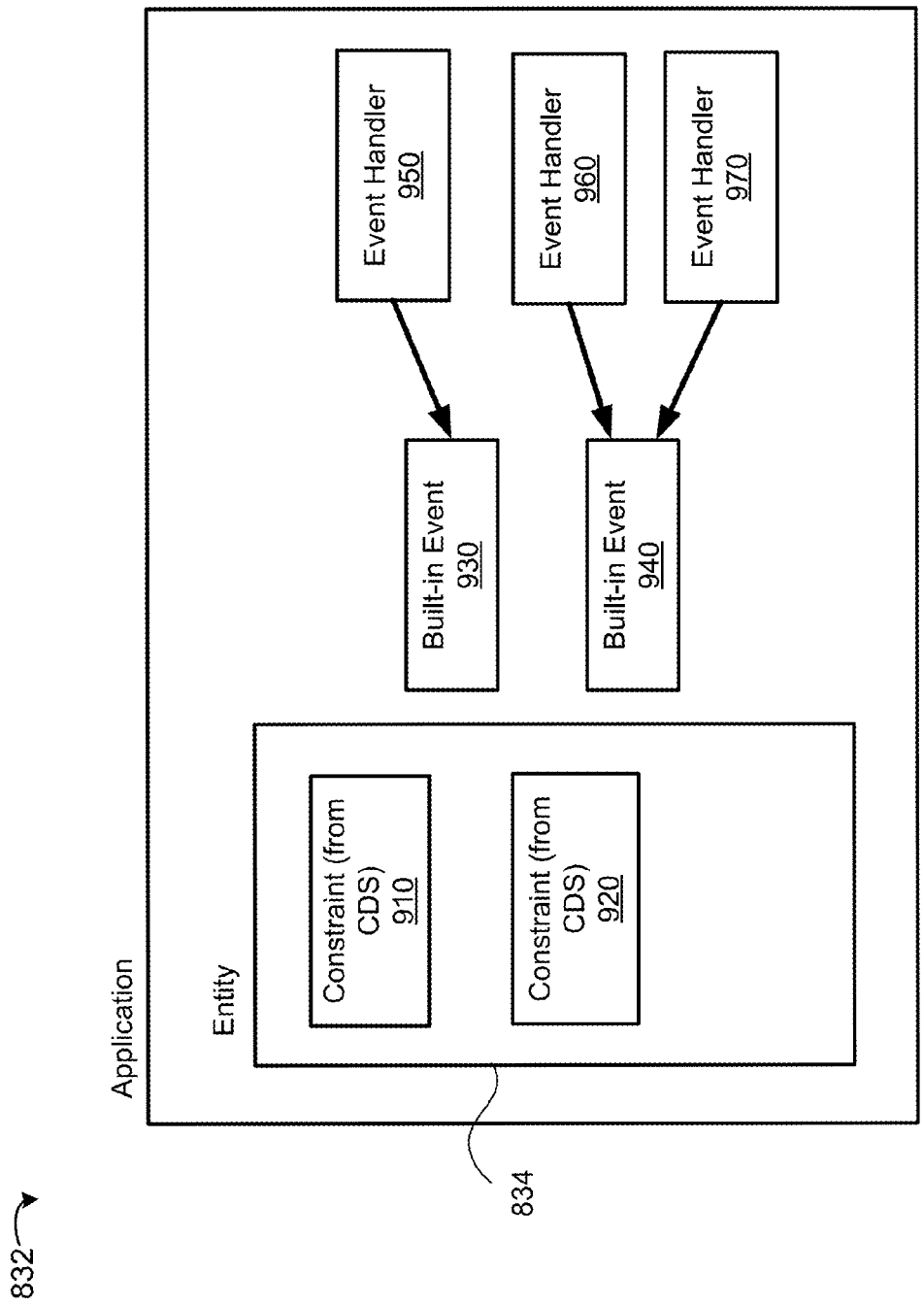
FIG. 9 illustrates an application that includes constraints defined in an event handler according to one embodiment.

FIG. 9 illustrates an application that includes constraints defined in an event handler according to one embodiment. Defining a constraint in an event handler has the advantage that a constraint created in the host language can be triggered by built-in events of the host language layer. As a result, creating constraints does not require a developer to be proficient in languages other than the host language. As shown here, application 832 includes entity 834. Entity 834 includes constraint 910 and constraint 920 (which are part of the entity defined in the data model), built-in event 930, and built-in event 940. These constraints and built-in events can be defined in the host language, data model, or the underlying database table. In one example, built-in event 930 and built-in event 940 can be one of on Save (which triggers the event when the object is saved), on Validate (which triggers the event when an explicit call to validate the object is detected), onInsert (trigger the event when the object is inserted), on Update (which triggers the event when the object is updated), and on CheckBeforeSave (which triggers the event when the object is checked prior to saving). An example of an entity with a built-in event is given below. As shown, entity salesOrder as defined in the data model includes a built-in event on Validate. Event handlers that are registered to the built-in event on Validate can be called when the built-in event is triggered.

```
entity salesOrder {
    event onValidate {
        //serialized representation of an entity could also be "this"
        element source : serializedData;
    }
}
```

An example of a built-in action that raises (i.e., triggers) an event is given below. As shown, a validate action performed on the entity raises event on Validate. Thus, the event on Validate is raised when an built-in validate action is detected.

```
@raise,error : 'system.constraintViolation';
action validate( ) {
    // open an error context here
    Raise event onValidate ;
    If system.messages.hasErrors( ) {
        Raise error system.constraintViolation;
    }
}
```

Application 832 further includes event handlers 950, 960, and 970. Event handlers 950, 960, and 970 can be generated in the host language and contain code configured to validate entity 834. In other words, each event handler can include a constraint. An example of an event handler that is defined on the entity is given below. As shown, the event handler is registered to event on Validate and includes a constraint configured to validate a property of the entity salesOrder. In other examples, the event handler can be defined apart from the entity yet be registered to a built-in event of the entity.

```
entity salesOrder {
    key ID : integer NOT NULL;
    customer : association to customer;
    OrderDate : date;
    createdBy : string;
    lastChangeDate : date;
    amount : amount {
        value : float
        currency : currency
    }
    action validate( ) // built-in action
    On event e : onValidate as validateAmount {
        Let so : salesOrder = deserialize( e.source );
        if so.amount.value != 0 {
            if !exists( so.amount.currency ) {
                // populate the error to the buffer as channel to communicate
                violations
```

```
        Let constraintError : system.message = { };
        constraintError.severity = severity.error;
        constraintError.identifier = 'validateAmount';
        constraintError.data = serialize( so );   // or just passing
        e.source
        system.messages.addMessage( constraintError );
      }
    }
}
```

Each event handler includes a constraint that can identify a built-in event that the event handler is to be registered to. In the example above, the event handler is to be registered to the event on Validate. Here, event handler 950 is to be registered to built-in event 930 while event handlers 960 and 970 are to be registered to built-in event 940. In one example, application 832 can register each event handler to its respective built-in event according to the constraint defined in each event handler. By registering event handler 950 to built-in event 930, application 832 calls event handler 950 when built-in event 930 is triggered (i.e., raised). When event handler 950 is called, the constraint defined in event handler 950 is performed. In one example, the constraint can be performed in a separate thread than application 832. In some examples where multiple event handlers are registered to the same built-in event, the multiple event handlers can be called simultaneously. The multiple event handlers can also be performed on separate threads. Here, application 832 can simultaneously call on event handler 960 and 970 when built-in event 940 is triggered. Calling on event handler 960 and 970 can include performing the constraints in the respective event handlers in separate threads.

Figure 10:
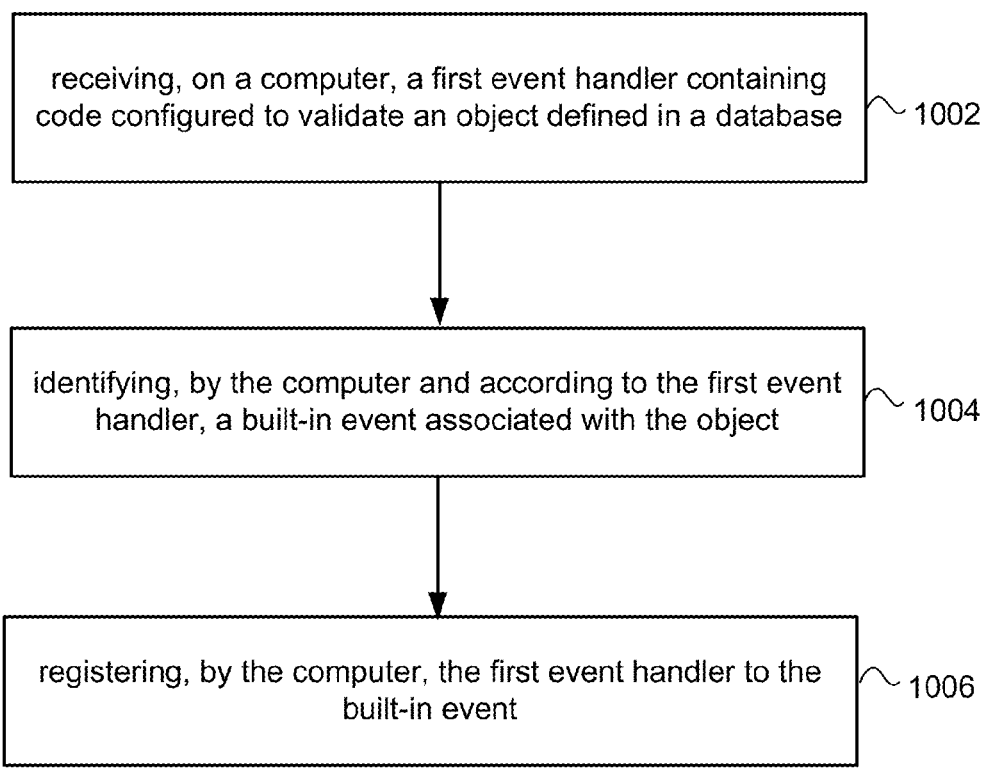
FIG. 10 illustrates a simplified view of a process flow 1000 according to an embodiment.

FIG. 10 illustrates a simplified view of a process flow 1000 according to an embodiment. Process 1000 begins by receiving, on a computer, a first event handler containing code configured to validate an object defined in a database at 1002. In one example, an application configured to manage the database and the first event handler is in a host language. The code can represent a constraint to validate an entity in an entity relationship model.

Process 1000 then continues by identifying, by the computer and according to the first event handler, a built-in event associated with the object at 1004. In one example, the built-in event is detecting that the object is modified. In another example, the built-in event is detecting an explicit call to the built-in event. The explicit call can be a built-in validate action belonging to the object or another built-in action associated with the object such as a save action or an update action.

Once the built-in event has been identified, process 1000 continues by registering, by the computer, the first event handler to the built-in event at 1006. The application can automatically call the first event handler when the built-in event is triggered. Calling the first event hander can include executing the first event handler on a separate thread than the application.

In some embodiments, a second event handler also written in the host language can be received that is also configured to validate the object. The second event handler can be registered to the same built-in event as the first event handler. When the built-in event is triggered, the application can call on the first event handler and the second event handler and the two event handlers can be executed in parallel. Each event handler can be performed by the computer in a separate thread.

Extended Data Model to Accommodate ERMs

Described herein are techniques for extending a relational model-based database language (e.g., Structured Query Language known as SQL), to accommodate higher level entity-relationship models. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
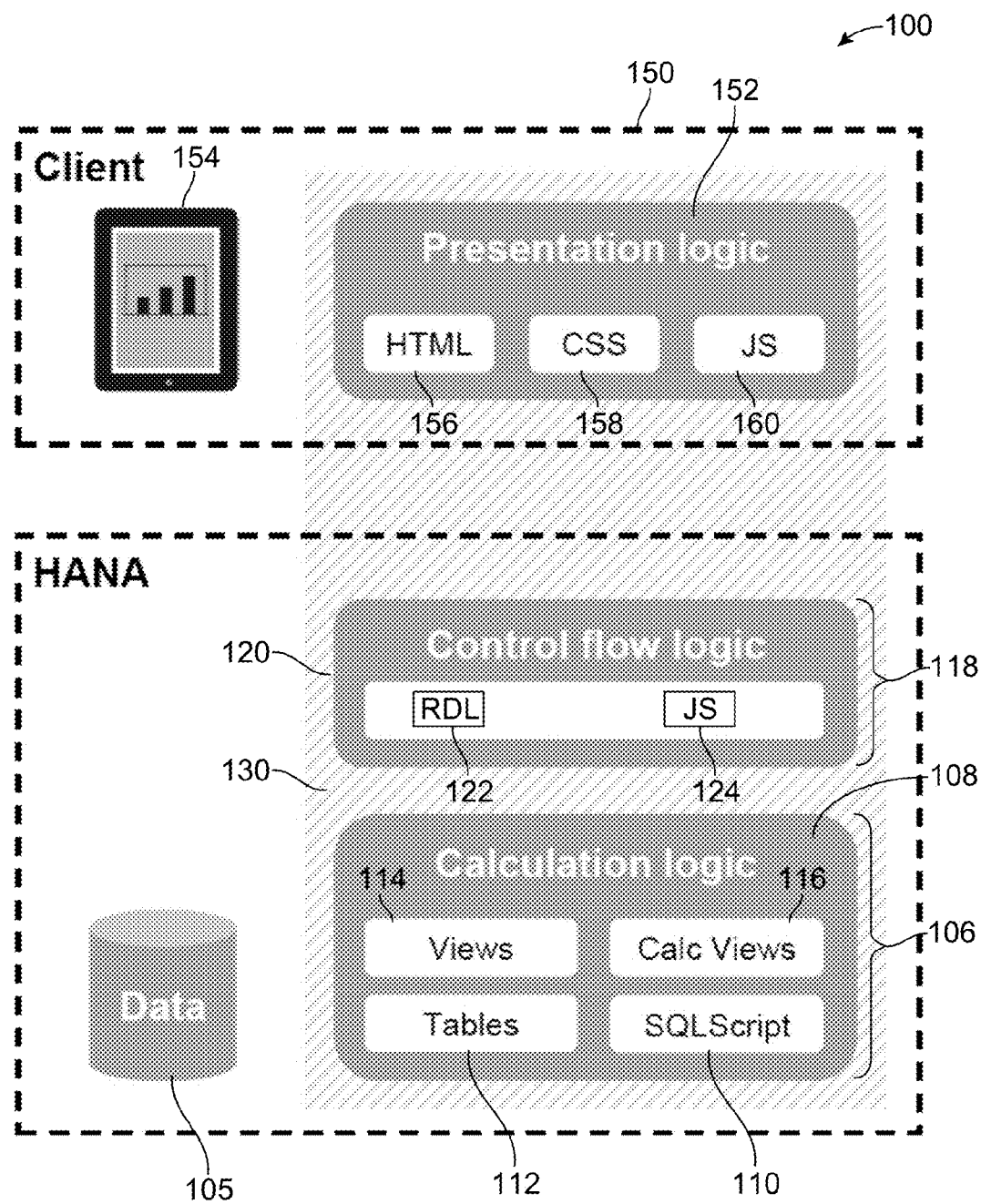
FIG. 1 shows a simplified view of a database system according to an embodiment.

FIG. 1 shows a simplified view of a database system 100, according to an embodiment. In particular, the database system 100 comprises data 105 of the database itself, organized according to a relational model.

A lower layer 106 of the database system comprises calculation logic 108 that is designed to interact with the data 105 itself. Such calculation logic 108 may be performed by various engines (e.g., SQL engine, calculation engine, SQL script) in order to provide basic data definition and processing based on the relational model. Such basic data definition can include defining of data types making up the database, associated metadata, and the database structure (e.g. columns, tables). The lower layer 106 of the database system may include SQL script 110, as well as data structures such as tables 112, views 114, and calculation views 116.

The embodiment presented in FIG. 1 shows HANA, the in-memory database available from SAP AG of Walldorf, Germany, implemented as the database. However, embodiments are not limited to use with this particular database. Examples of other in-memory databases include, but are not limited to, the SYBASE IQ database also available from SAP AG; the Microsoft Embedded SQL for C (ESQL/C) database available from Microsoft Corp. of Redmond, Wash.; the Exalytics In-Memory database available from Oracle Corp. of Redwood Shores, Calif., etc.

Further, while the embodiment presented in FIG. 1 shows the database as comprising an in-memory database, various embodiments could be employed in conjunction with conventional disk-based database systems.

An application layer 118, overlying the calculation logic 108 of the database system 100 comprises control flow logic 120. The control flow logic 120 may be implemented utilizing River Definition Language (RDL) 122 and JavaScript (JS) 124 to reference model concepts such as entities and relationships that are not reflected in basic SQL. This control flow logic 120 may further comprise common languages for defining and consuming data across different containers (e.g. native, ABAP, Java).

As shown in FIG. 1, in order to facilitate the sharing of information across such different containers and thereby promote a more unified environment, the database system 100 may further comprise a Core Data Services (CDS) component 130. CDS component 130 comprises a common set of domain-specific languages (DSL) and services. The CDS component 130 may allow defining and consuming semantically rich data models as an integral part of the database structure, thereby permitting data modeling as well as the retrieval and processing of data to be raised to a higher semantic level that is closer to the conceptual thinking of domain experts. The role of the CDS component 130 is discussed in detail further below.

FIG. 1 further shows client 150 in communication with the HANA in-memory database appliance available from SAP AG. The client 150 includes presentation logic 152 to provide an output 154 comprising data 105 of the underlying database structure in a form desired by a user. Here, the output 154 is shown as a vertical bar chart, but of course this represents only one of a multitude of different ways in which the data may be communicated to a user. The presentation logic 152 may communicate such output in the form of HTML 156, cascading style sheets (CSS) 158, and/or JavaScript 160, or a variety of other user interface technologies.

Figure 2:
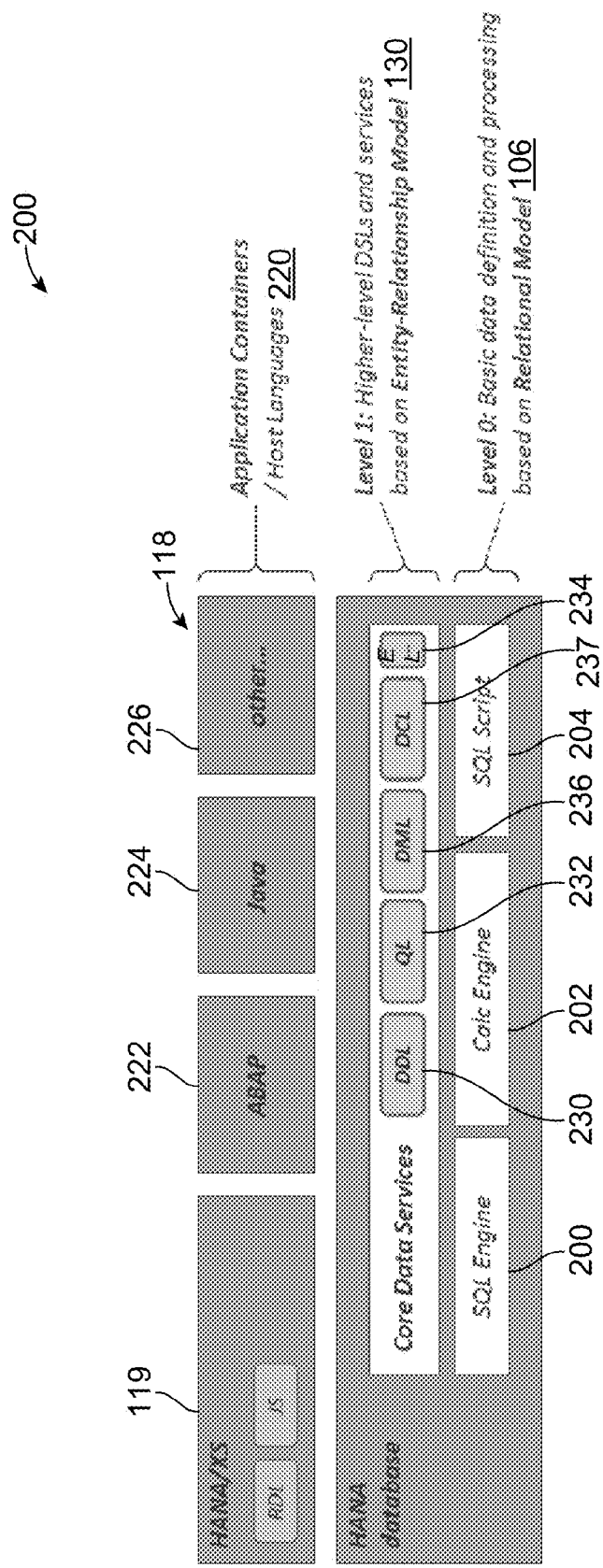
FIG. 2 shows an enlarged view of the database structure of FIG. 1.

FIG. 2 shows an enlarged view of the HANA in-memory database structure of FIG. 1. In particular, FIG. 2 shows SQL engine 200, calculation engine 202, and SQL script 204, as part of the lower layer 106 that performs basic data definition and processing based upon the relational model, according to which the data 105 of the database is organized. FIG. 2 also shows the application layer 118 of the database structure of FIG. 1, including the RDL and JS elements of a query engine 119. The application layer 118 further comprises application containers and other host languages 220, including ABAP 222, Java 224, and others 226.

FIG. 2 further shows the CDS component 130 situated between the lower layer 106 and the application layer 118. As illustrated in this figure, the CDS component 130 can be leveraged in any consuming stack variant (stack of software layers located on top of each other), as implemented through the application layer 118. Specifically, services in higher layers can use/consume the services of lower layers. Here, because the application layer sits on top of a data layer in which the CDS component 130 resides, definition and consumption of the semantically rich higher-level models is allowed.

In particular, the CDS component 130 implements higher-level Domain Specific Languages (DSLs) and services based on an entity-relationship model (ERM). The Data Definition Language (DDL) 230 is used for defining semantically rich data models, including the data types, associated metadata, and database organization (e.g., columns and tables). As mentioned throughout, according to embodiments, the DDL may be extended to further enrich these data models through the use of entities and annotations.

The Query Language (QL) 232 is used to conveniently and efficiently read data based on data models. It is also used to define views within data models. The role of the QL 232 and its relation to the DDL 230 is further illustrated in connection with FIG. 3.

The Expression Language (EL) 234 is used to specify calculated fields, default values, constraints, etc., within queries. Calculated fields, default values, and constraints may be specified as well as for elements in data models.

Other elements of the CDS component 130 can include Data Manipulation Language (DML) 236 and a Data Control Language (DCL) 237, both of which may be used to control access to data.

Figure 3:
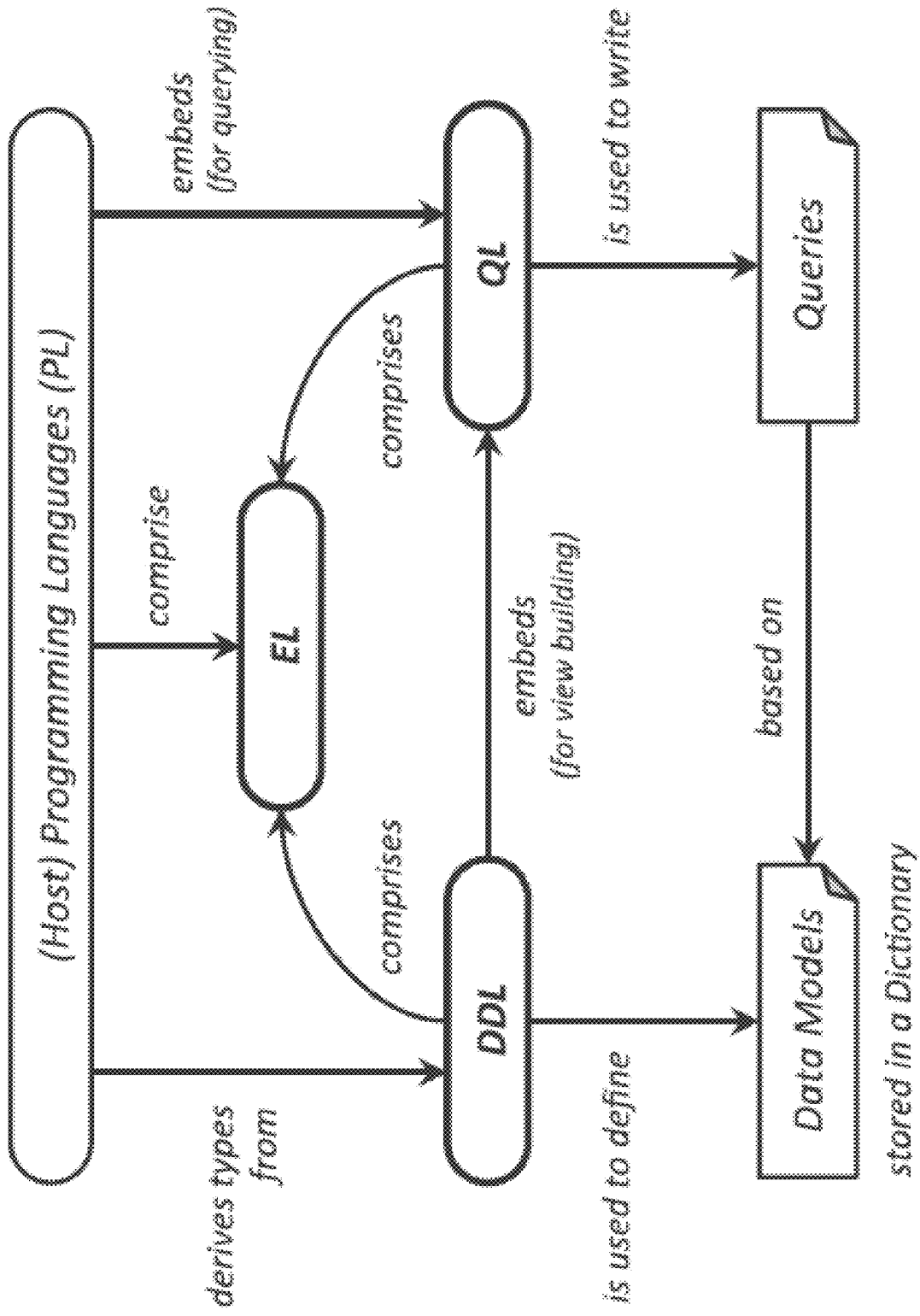
FIG. 3 illustrates relationships between individual languages making up a language family useful for interacting with a database.

Embodiments as described herein may distinguish between the domain-specific languages DDL, QL, and EL as members of a language family. This approach fosters considerations such as modular design, incremental implementation, and reuse. FIG. 3 is a simplified view illustrating relationships between these language family members. A consistent language experience across the members of the family of FIG. 3 can be achieved by ensuring the languages follow a common style. This can extend to the host programming language, with expressions in DDL, QL, and EL code adopting the same syntax. Utilization of application level domain language(s) as has been described above, can offer certain benefits. One possible benefit is that the application domain level language can avoid the use of "inefficient" and error-prone code.

Take, for example, the following simple data model describing employee information:

```
entity Employee {
    name : String(77);
    salary : Amount;    // a structured type
    orgunit : Association to OrgUnit;
    addresses : Association to Address[0..*] via entity
    Employee2Address;
    homeAddress = addresses[kind=home];    // introduced later on
}
entity OrgUnit {
    name : String(111);
    costcenter : String(44);
    manager: Association to Employee;
    parent: Association to OrgUnit;
}
entity Address {
    key streetAddress; key zipCode; city;    // omitted type defs
    kind : enum { home; business; }
}
```

Under some circumstances, it may be desired to write a query statement as follows:
SELECT id, name, homeAddress.zipCode FROM Employee WHERE . . . .

Within that sample snippet, path expressions along relationships are used to fetch data from an associated entity. In the simple data model above, the above query statement is equivalent to the following standard SQL statement:

```
SELECT e.id, e.name, a.zipCode FROM Employee e
LEFT OUTER JOIN Employee2Address e2a ON e2a.employee = e.id
LEFT OUTER JOIN Address a ON e2a.address = a.id AND a.type=
'homeAddr'
WHERE ...
```

This statement, however, may already be too complex for many application developers. Thus, code patterns similar to that given below, may be used in some pseudo languages:

```
customers = SELECT * FROM Customer
foreach c in customers do
    write c.id
    write c.name
    addresses = SELECT * FROM Address a, $Customer2Address c2a
        WHERE a.id = c2a.address AND c2a.customer = :c.id
    foreach a in addresses do
        if a.type = 'homeAddr' then write a.zipCode
    end
end
```

There are several issues with the code presented immediately above. One issue is the use of an imperative coding style with loops in loops, resulting in 1+n queries being executed or too much data being fetched with a SELECT * statement.

The above code represents only a relatively simple case. A more complex case is found in the following example:

```
SELECT FROM OrgUnit[boardarea='TIP'] .employees[salary>
'$100.000'] {
    addresses[kind=home].city, count(*)
}
```

The preceding cases illustrate the importance of increasing expressiveness of the languages used in application development (here, the query language). This allows the intent of application developers to be captured, rather than being buried under substantial volumes of imperative boilerplate coding.

Such expressiveness is in turn is fundamental to having optimizations applied by the query engine (in a manner analogous to functional programming vs. imperative programming). This can affect system characteristics, such as its overall performance and scalability. Further, a language's ability to allow developers to draft concise and comprehensive code, can increase developer productivity. It can also reduce the risk of mistakes and also enhance readability, and thus increase the maintainability of the code.

In order to write concise and readable query statements, it is desirable to enrich the data definitions with sufficient metadata (e.g., about associations, semantic types, etc.). Accordingly, embodiments seek to extend the DDL to define data definitions with sufficient metadata, and seek to extend the QL to leverage such definitions.

DDL and QL are declarative, domain-specific languages providing developers with concise ways to express their models and queries. Certain concepts may originate from entity-relationship modeling (ERM). By adding native support for such concepts in the underlying engine of the database, embodiments avoid the impedance mismatch induced by the translation of conceptual models based on ERM into implementations based upon a plain relational model. In particular, writing concise and comprehensive code reduces risks of mistakes and increases readability and maintainability.

Moreover, as the concepts of entity-relationship models may lie at the core of many higher-level models, embodiments are able to capture the semantics of other data models (e.g., RDL-based data models), and share those semantics with database modelers, and/or ABAP of SAP AG, or Java consumers. This reduces fragmentation and the loss of semantics. In addition, since ERM is also the chosen basis for technologies like OData EDM, embodiments can facilitate mapping entities and views to OData entity sets.

Embodiments may employ a functional approach that is based on standard SQL. In particular, the comprehensive, domain-specific nature of DDL and QL allows capturing the intent of application developers, thus avoiding a lack of clarity regarding that intent which can result from large volumes of imperative boilerplate coding. This follows the principles of functional programming and is important for optimizations.

The functional approach may be inherited from SQL. A SQL SELECT statement declares which sub-set of an overall data model is of interest as projections and selections. It may be left to the query engine to determine optimal execution, including parallelizing as appropriate.

In contrast with imperative object traversion patterns, embodiments can speed up many data retrieval use cases. While many of those retrieval cases are not individually expensive, the cumulative impact of this streamlining can have significant impacts on scalability, as it affects all requests over long periods of time.

Embodiments address some of the complexity offered by standard SQL to typical application developers by raising the basis of SQL from plain relational models to the level of conceptual models. This is done by providing native support for ERM in the database system. In this manner, the use of SQL may be reestablished for most application developers, not only for those with the SQL expertise for specific optimization tasks.

Embodiments employ associations in DDL. Specifically, the DDL allows definition of data models as entity-relationship models on a semantically rich level that is close to actual conceptual thought. To achieve this over the conventional relational model of standard SQL, certain concepts are captured by the embodiments described herein.

Figure 4:
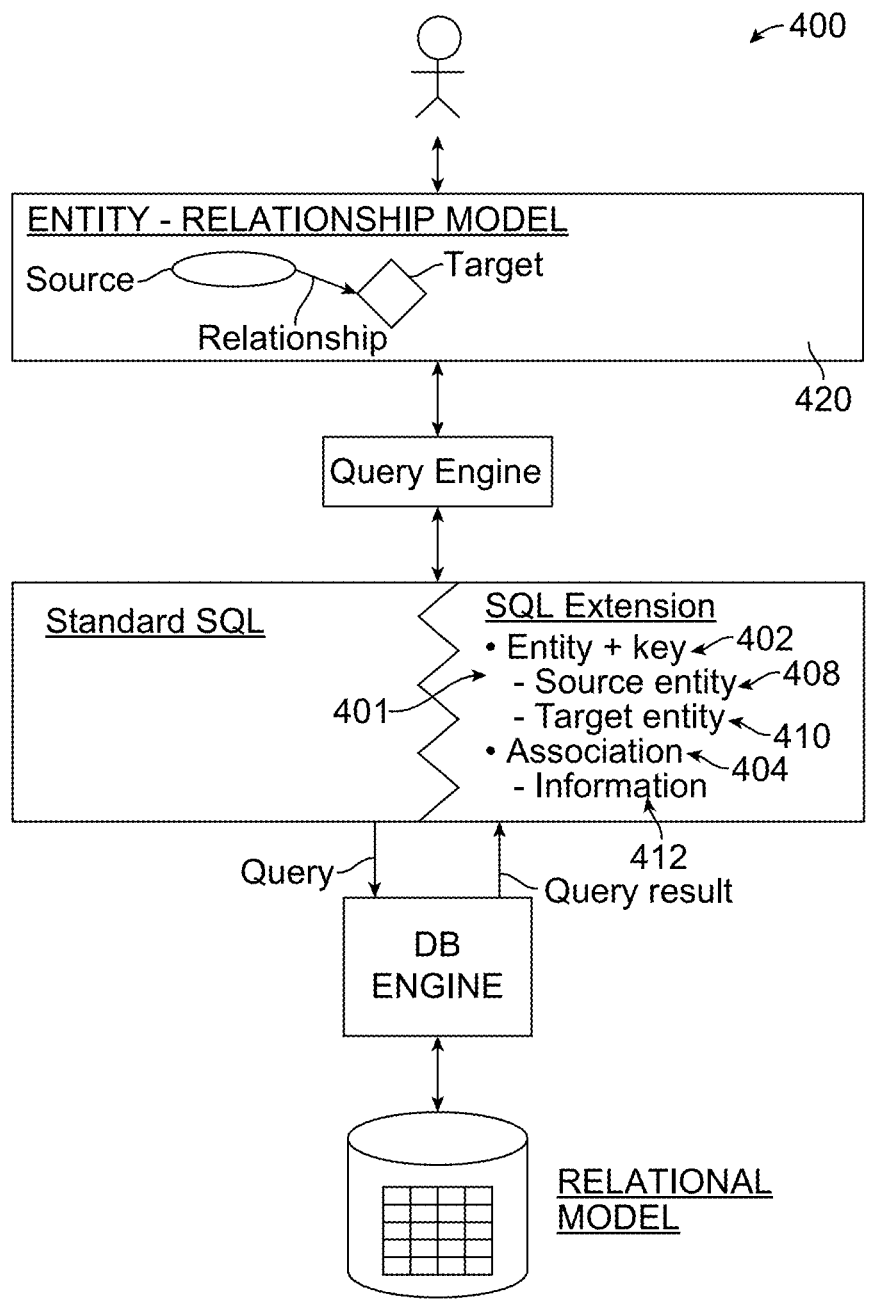
FIG. 4 is a simplified view showing an approach for extending SQL according to embodiments.

FIG. 4 is a simplified view showing an approach for extending SQL according to embodiments. As shown in the system 400 of FIG. 4, one concept underlying embodiments as described herein, is the use of entities 401 with structured types, in contrast with a conventional relational database which uses only flat tables. Entities are structured types with an underlying persistency and a unique key 402. Structured types are records of named and typed elements. An entity key is formed of a subset of the elements of the entity that uniquely identify instances. Views are entities defined by a query, which essentially defines a projection on underlying entities.

Another concept underlying entities as described herein, involves employing associations 404 on a conceptual level. This approach contrasts with the conventional use of hand-managed foreign keys. Associations define relationships between entities, and are specified by adding an element with an association type to a source entity 408 that points to a target entity 410. As shown in the FIG. 4, the relationship implemented by the association type, between source entity type and the target entity type, reflects the actual relationship between entities in the overlying ERM model 420. Using the type definition, associations may capture metadata about relationships present in the ERM in a 'reflectable' way. According to such a reflectable characteristic, a consuming portion of code receiving a piece of data from the database can get back to the type information (i.e., metadata) provided for the respective elements in the data model.

The association may be complemented by optional further information (e.g., regarding cardinality, which keys to use, additional filter conditions, etc.) up to a complete JOIN condition. According to embodiments, the clause-based syntax style of standard SQL may be adopted for specifying the various parameters without sacrificing readability.

In addition, the extended DDL works with custom-defined Types instead of being limited to primitive types only. The extended DDL may also add other enhancements, such as annotations, to enrich the data models with additional metadata, constraints, or calculated fields.

Figure 5:
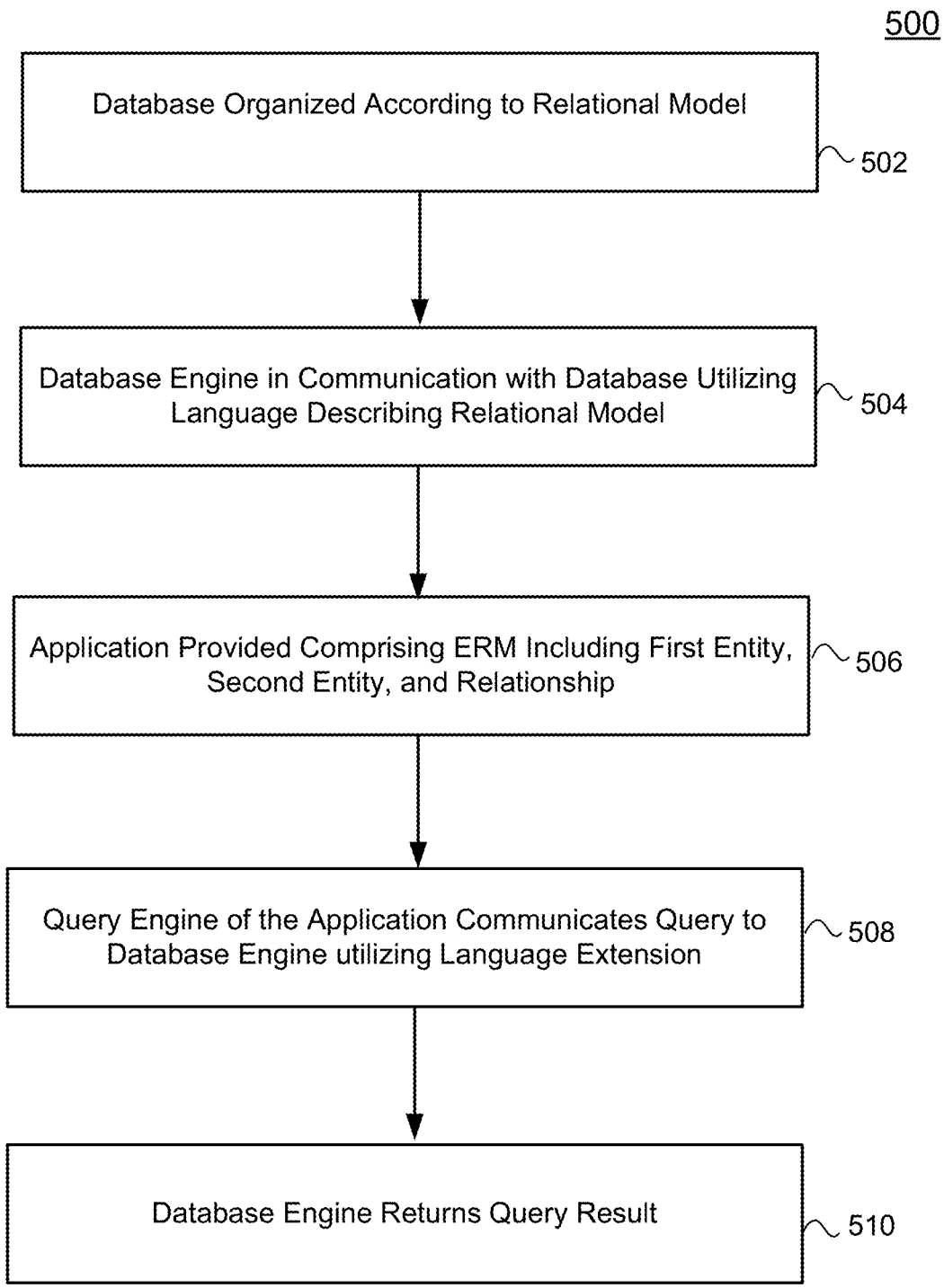
FIG. 5 is a simplified diagram illustrating a process flow according to an embodiment.

FIG. 5 is a simplified diagram illustrating a process flow 500 according to an embodiment. In a first step 502, a database is provided comprising data organized according to a relational model.

In a second step 504, a database engine is provided in communication with a database utilizing a language describing the relational model. In a third step 506, an application is provided comprising an entity-relationship model (ERM) including a first entity, a second entity, and a relationship between the first entity and the second entity.

In a fourth step 508, a query engine of the application communicates a query to the database engine utilizing a language extension providing the entity and relationship components of the ERM. The language extension may comprise a first structured entity type including a first key and indicating the first entity, a second structured entity type including a second key and indicating the second entity, and a third structured association type reflecting the relationship. The association type may be complemented with further additional information.

In a fifth step 510, the database engine returns a query result to the query engine based upon the language extension.

EXAMPLES

Some examples of extension of the SQL database language to provide entities and associations of ERMs, are now given below.

```
entity Address {
    owner : Association to Employee;    // can be used for :m associations
    streetAddress; zipCode; city;       // snipped type defs
    kind : enum { home, business };
}
entity Employee {
        addresses : Association[0..*] to Address via backlink owner;
        homeAddress = addresses[kind=home]; // → using XPath-like
    filter.
}
Association to Address;
Association to Address { zipCode, streetAddress };
Association [0..*] to Address via backlink owner;
Association [0..1] to Address via backlink owner where kind=home;
Association [0..*] to Address via backlink owner where zipCode
    like '76*';
Association [0..*] to Address via entity Emp2Adr;
Association [0..1] to Address via entity Emp2Adr where kind=home;
Association [0..*] to Address on owner=this;
Association [0..*] to Address on Address.owner._id = Employee._id;
Association to Address on owner=this AND kind=home;
```

For specifying syntax, embodiments may use a derivate of the Backus Naur Form (BNF) family of metasyntax notations used to express a context-free grammar, and which can be relied upon to make a formal description of a computer language. The basic constructs may be summarized as follows:

| Construct | Notation | Comments |
|---|---|---|
| definition | = | Definitions are written with a single equals sign, e.g. Rule = ... |
| extension | += | Extends a definition introduced before by additional rules |
| terminal symbol | keyword | Language keywords are set in bold red |
| terminal character | "." | Single-character language symbols are set in double quotes |
| alternation | ... \| ... | Pipe symbols separate alternatives, e.g. foo and bar \| zoo w/ car |
| grouping | ( ... ) | Parenthesis group constructs, e.g. ( foo \| bar ) with car |
| option | [ ... ] | Square brackets designate optional constructs, e.g. [ optional ] |
| repetition | ...* | 0+ repetitions are indicated by appended "*", e.g. zeroOrMore* |
| repetition | ...+ | 1+ repetitions are indicated by appended "+", e.g. oneOrMore+ |
| comment | -- ... | Comments start with a double-dash, e.g. -- this is a comment |

Syntax for SQL extended to include entities and associations as described herein, may be described as follows:

```
AssignedType += | AssociationType
AssociationType = Association [ cardinality ] ( to targetEntity ) [
    managedJoin | unmanagedJoin ]
```

-continued

```
cardinality = "[" [( maxs |* ) "," ] [ min .. ] ( max|* ) "]"  | "[ ]"
targetEntity = QualifiedName
managedJoin = ( forwardLink | backwardLink | mediatedLink ) [ where
    filterClause ]
    forwardLink = "{" foreignKeys "}"
    backwardLink = via backlink reverseKeys
    mediatedLink = via entity entityName
    foreignKeys = targetKeyElement [ AS alias ] [ "," foreignKeys ]
    reverseKeys = targetKeyElement                [ "," reverseKeys ]
    targetKeyElement = elementName ( "." elementName )*
unmanagedJoin = on filterClause
```

From DDL perspective, association is a new primitive type that is specified with the type name Association, followed by several parameter clauses to specify requisite metadata. These parameter clauses are as follows:

Cardinality allows specifying the relationship's cardinality in the form of [min . . . max], with max=* denoting infinity and " " as a shorthand for [0 . . . *]. As a default, if omitted [0 . . . 1] is used as the default cardinality. An example is:

Association[ ] to Address via backLink owner;

To targetEntity specifies the association's target entity. A qualified name is expected, referring to another entity (incl. views). Specifying the target is mandatory—there is no default.

{foreignKeys} allows specifying a combination of alternative key elements in the target entity, to be used to establish the foreign key relationship. Where a key element is in a substructure on the target side, an alias name is to be specified. Further details are provided below regarding associations represented as foreign key relationships.

If omitted, the target entity's designated primary key elements are used. The following are examples:

```
Association to Address { zipCode, streetAddress };
Association to Address { some.nested.key AS snk };
```

Another parameter clause is VIA backlink: reverseKeys. For 1:m associations, it is mandatory to specify target elements, which are expected to be a key combination matching the source's primary keys or an association referring to the source entity. An example is:

Association to Address via backLink owner;

Another parameter clause is VIA entity: entityName. For m:m associations, it is mandatory to specify a link table's entity name. That name can either refer to a defined entity or a new entity will be created as follows:

```
entity <entityName> {
        <nameOfSourceEntity> : Association to <SourceEntity>;
        <nameOfTargetEntity> : Association to <TargetEntity>;
}
```

If the data model contains an explicit definition of the link table entity, that entity must adhere to the template shown above. It can, in addition, add other elements. An example is given below:

```
Association to Address via entity Employee2Address;
entity Employee2Address {
        employee : Association to Employee;
        address : Association to Address;
}
```

The WHERE filterClause allows specifying additional filter conditions that are to be combined with the JOIN conditions. This can be especially relevant in combination with VIA backlink or entity clauses. Depending on the filterCondition this can reduce a base :m relationship to one with a:1 cardinality. An example is given below:

Association to Address[0 . . . 1] via backLink owner where kind=home;

The ON filterClause allows fully specifying an arbitrary join condition, which can be any standard SQL filter expression. Using this option results in the respective association being user-managed. That is, no foreign key elements/fields are created automatically. The developer is expected to explicitly manage the foreign key elements, including filling them with appropriate foreign key values in write scenarios. An example is given below:

Association to Address on owner=this;

Element names showing up in VIA, WHERE, and ON clauses, are resolved within the scope of the target entity's type structure. Siblings can be referred to by prefixing an element with a ".". Elements from the scope above can be referred to by prefixing an element with " . . . ", etc.

In addition, the outer entity's top-level scope can be referred through the pseudo variable "this", which is described further below in connection with Pseudo Variables in QL.

According to embodiments, associations are represented as foreign key relationships. In the relational model, associations are mapped to foreign key relationships. The foreign key elements are usually created automatically as described in the following sections. In particular, an element with association type is represented as a nested structure type containing foreign key elements corresponding to the target entity's primary key elements—i.e. having the same names and types. The following are examples of definitions which may be given:

```
entity Employee { ...
address1  : Association to Address;
address2  : Association to Address { zipCode, streetAddress };
addresses : Association to Address[0..*] via backlink owner;
}
```

In this example, the association elements would implicitly be defined with a nested structure type containing foreign key elements in the :1 cases (plus additional metadata about the association) as follows:

```
entity Employee { ...
address1 {
  _ID                : type of Address._ID;
}
  address2 {
    zipCode          : type of Address.zipCode;
    streetAddress    : type of Address.streetAddress;
  }
  addresses { /* none at all since :m */ }
}
```

Following the rules for mapping structured types to the relational model as specified above, the underlying table would be created:

```
CREATE TABLE Employee ( ...
"address1._ID" Integer,
```

```
"address2.zipCode" String(...),
"address2.streedAddress" String (...)
)
```

Rules for representing associations in the persistence model may apply, as indicated in the table below:

| If . . . is specified | for to-one cases, e.g. [0 . . . 1] | for to-many cases |
|---|---|---|
| <no join clause> | Nested foreign key elements are created for target's primary key elements. | not allowed |
| {foreignKeys} | Nested foreign key elements are created for the elements specified in foreignKeys. | |
| VIA backlink reverseKeys | No nested foreign keys are created; instead the reverseKeys are expected to link back from target to source. | |
| VIA entity entityName | No nested foreign keys are created; instead the link table named entityName is created/used as described above. | |
| ON joinCondition | No nested foreign key elements are created; managing the foreign key relationship is completely up to the developer. | |

Consistent with the approach in SQL, no plausibility checks are enforced (e.g., checking whether target key elements specified in {foreignKeys} fulfill the uniqueness requirements). Also, no implicit referential integrity checks are enforced at runtime.

According to embodiments, associations may be in custom-defined types. As associations are special types, they can principally be defined not only for elements in entity definitions, but in type definitions in general. For example, the following definition of the association Amount.currency is valid DDL content:

```
entity Currency {          // List of pre-defined Currencies
key code : String(3);
description : String(33);
}
type Amount {
value : Decimal(10,2);
currency : Association to Currency;
}
```

An actual relationship between entities is established when using the type Amount for an element within an entity definition, as in:

```
entity Employee {
  salary : Amount;
  address : Association to Address;
}
```

The code shown above essentially indicates that the entity Employee has two associations—one association is to Address and another association is to Currency within its salary element.

Associations in custom-defined types may only be supported for a simple "to-one" relationship with a foreign key on the source side. That is, associations with via backlink or via entity clauses may not be supported for elements in custom-defined types.

Associations in Query Language (QL) are now discussed.
Querying Associations with :m Cardinality
Resolving associations or compositions with 1:m cardinality using path expressions or nested projection clauses with the flattening operator "." in place results in flat result sets with duplicate entries for the 1: side, which is in line with standard SQL JOINs and the relational model.

As examples, in the following queries, "addresses" refers to an association with "to-many" cardinality [0 . . . *]:

```
SELECT name, addresses.city FROM Employee;
SELECT name, addresses.{ zipCode, city } FROM Employee;
```

The result sets for the example queries above, are shown below, each with the same value for name repeated/duplicated for each found entry on the :m Address side:

```
<Result Set 1> { name, city }
<Result Set 2> { name, zipCode, city }
```

Embodiments also allow the return of 'Deep' Result Sets. Specifically, in addition to the standard flattening behavior, the introduction of nested projection clauses and structured result sets principally allows expression of 'deep' queries along :m associations. These deep queries return 'real deep' result sets having the 1: sides elements on a top level, with nested tables/sets for the :m sides.

For example, the deep query:
SELECT name, addresses {zipCode, city} FROM Employee;
would be expected to return a result set with a nested collection as shown below:

```
<Result Set> {
    name,
    addresses : <collection of> Address { zipCode, city }
}
```

Such deep querying may provide certain benefits. One possible benefit is to allow retrieving larger structures through a single query.

Currently, in the absence of deep querying, such larger structures may frequently be obtained in a brute-force approach, through 1+n queries with n being the number of records returned by a 1: side query. This is detrimental to performance, particularly if such a query spans several levels of to-many associations.

While the other extensions can be realized by translating to standard SQL queries, this one requires adding special support deep within the query engine. The absence of such support may preclude using to-many associations in the non-flattened way. This is discussed further below in the associations of FROM clauses, regarding how association trees can be traversed.

Associations in WHERE Clauses

Associations can arise not only in projection clauses but also in filter conditions in WHERE clauses. Respective comparison operators may be enhanced to support associations, as depicted in the following examples:

```
1. SELECT ... from Emloyee WHERE orgunit={ _id: '4711' };
2. SELECT ... from Emloyee WHERE homeAddress={
   zipCode: '76149', streetAddress: 'Vermontring 2'
};
3. SELECT ... from Emloyee WHERE orgunit='4711';
4. SELECT ... from Emloyee WHERE homeAddress.city like 'Wall%';
```

```
5. SELECT ... from Emloyee WHERE homeAddress.city IN ( 'Walldorf', ...);
6. SELECT ... from Emloyee WHERE address IS NULL;
7. SELECT ... from Emloyee WHERE address[kind=home].city = 'Walldorf';
8. SELECT ... from Emloyee WHERE homeAddress = addresses[kind=home];
```

Several issues arising within the examples immediately above, may be worthy of note. In connection with:
ad 1,2: A record literal can be passed to a comparison with an association, with elements that match the combination of the foreign keys.
ad 3: Support for Association type in QL includes automatic coercions of typed scalars or string representations thereof to single-key associations.
ad 4: One can also refer to the individual key values using standard path expressions.
ad 5ff: Other SQL comparison operators can be used, such as LIKE, IN, IS NULL, . . . .
ad 8: It can be combined with XPath-like filter expressions.
ad 9: It can be combined with compare associations, provided they are assignable.

The above provides just a few examples to give the idea. In general, every condition that is possible with standard SQL expressions shall be possible to do with associations as well, including sub queries with exists and not exists, etc.

Associations in FROM Clauses

Embodiments may also allow associations in FROM clauses. Specifically, host languages may provide support for representing associations as typed variables or elements. This is described below in connection with association types in host languages.

Accordingly, one can traverse along associations, as shown in the following examples (in some pseudo language):

```
var daniel = SELECT name, homeAddress FROM Employee WHERE name='Daniel';
// ... and somewhat later, maybe at some other place in an application...
var addresses = SELECT * FROM Address WHERE this=daniel.homeAddress;
```

The expression this=<an association> can be used. The comparison this=<an association> can be retrieve an entity by a given association. The pseudo variable this is always an alias for the entity given in the FROM clause. Therefore, the statement above actually resolves to:
SELECT * FROM Address this WHERE this=daniel.homeAddress;

The comparison this=<an association> compares a queried entity with a given association—the association must be of type Association to <queried entity>[ . . . ]. This expands to a WHERE clause corresponding to the ON condition resolved from the association. In this case it would actually resolve to:

```
SELECT * FROM Address this
    WHERE   this.zipCode = daniel.homeAddress.zipCode
    AND     this.streetAddress = daniel.homeAddress.streetAddress
    AND     this.type = 'home';
```

Embodiments may also allow the use of SELECT from association. Specifically, association-traversal code patterns like the one below are frequently seen:
SELECT * from Address WHERE this=daniel.homeAddress;
An association in general, and a programming language variable with association type support in particular, carries all information about a target record—essentially providing information as to which entity goes with which key. Thus equivalent to the query above, embodiments allow the shorthand below for traversing associations:
SELECT * from daniel.homeAddress;
In general, a query statement of the form SELECT . . . from <someAssociation> expands to:

```
SELECT ... from <someAssociation>.<targetEntity> WHERE
   this=<someAssociation>;
```

Here, <targetEntity> signifies the metadata associated with the association corresponding to the target entity specified in the association's declaration using the ON targetEntity clause.

JOINs Declare Ad-Hoc Associations

Embodiments allow JOINs to declare ad-hoc associations. In the case of a missing association, the standard JOIN <target> ON <join condition> clauses as introduced in SQL-92 are still supported, which align with the extensions introduced above, as they naturally introduce associations in an ad-hoc fashion.

For example, in the data model given above, the entity Employee has an association homeAddress, but is lacking a similar association for businessAddress, which can be compensated for using a standard JOIN clause as follows:

```
SELECT FROM Employee e
   ASSOCIATION TO Employee2Address e2a ON
      e2a.employee = e
   ASSOCIATION TO Address businessAddress ON _id =
e2a.address._id AND kind=business
   {
   ID, name,
   businessAddress { streetAddress, zipCode, city }
   }
```

The expression may follow the syntax below:

```
JoinClause += | JOIN targetEntity [[AS] Identifier ]
   JoinConditionClauses
```

Other syntax is as discussed above in connection with associations in DDL.

JOIN clauses fit easily into the extensions in DDL and QL. JOIN clauses can be interpreted as an ad-hoc definition of missing associations.

In the example immediately above, the association businessAddress is added. This result is recognized if the projection clause of the example above, is compared to that of the query applied to the domain model if the association were in place (below):

```
SELECT FROM Employee {
   ID, name,
   businessAddress { streetAddress, zipCode, city }
   }
```

Embodiments also allow the use of simplified JOIN clauses. In particular, following the observation that JOINs essentially declare ad-hoc associations, embodiments JOINs to be declared using the same clauses that are used to declare associations in DDL. Given this, the above example can be written more easily as follows:

```
SELECT FROM Employee e
   ASSOCIATION TO Address businessAddress VIA entity
      Employee2Address
   WHERE kind=business
   {
   ID, name,
   businessAddress { streetAddress, zipCode, city }
   }
```

Figure 6:
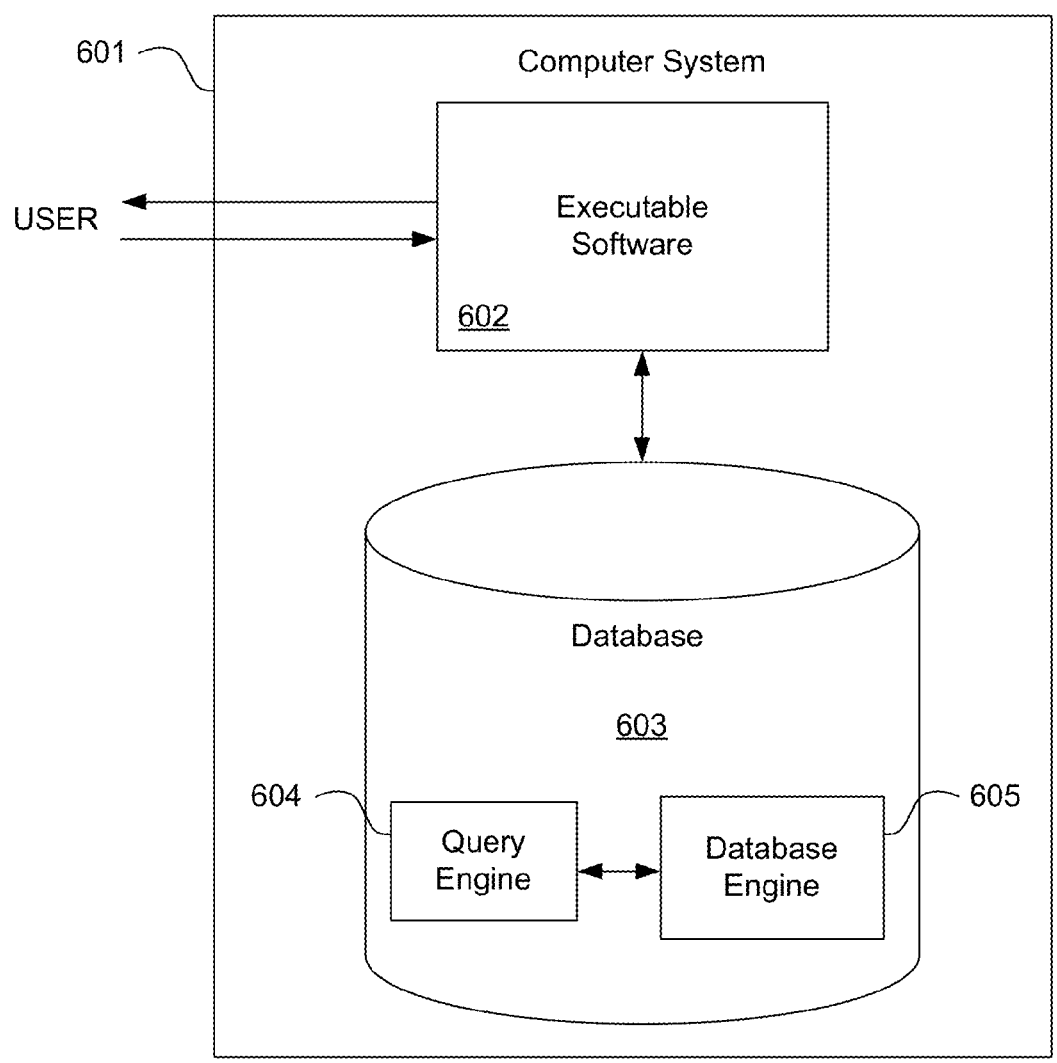
FIG. 6 illustrates hardware of a special purpose computing machine configured to extend database entity-relationship models execution according to an embodiment.

FIG. 6 illustrates hardware of a special purpose computing machine configured to extend database entity-relationship models according to an embodiment. In particular, computer system 600 comprises a processor 602 that is in electronic communication with a non-transitory computer-readable storage medium 603. This computer-readable storage medium has stored thereon code 604 corresponding to a query engine. Code 605 corresponds to a database engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
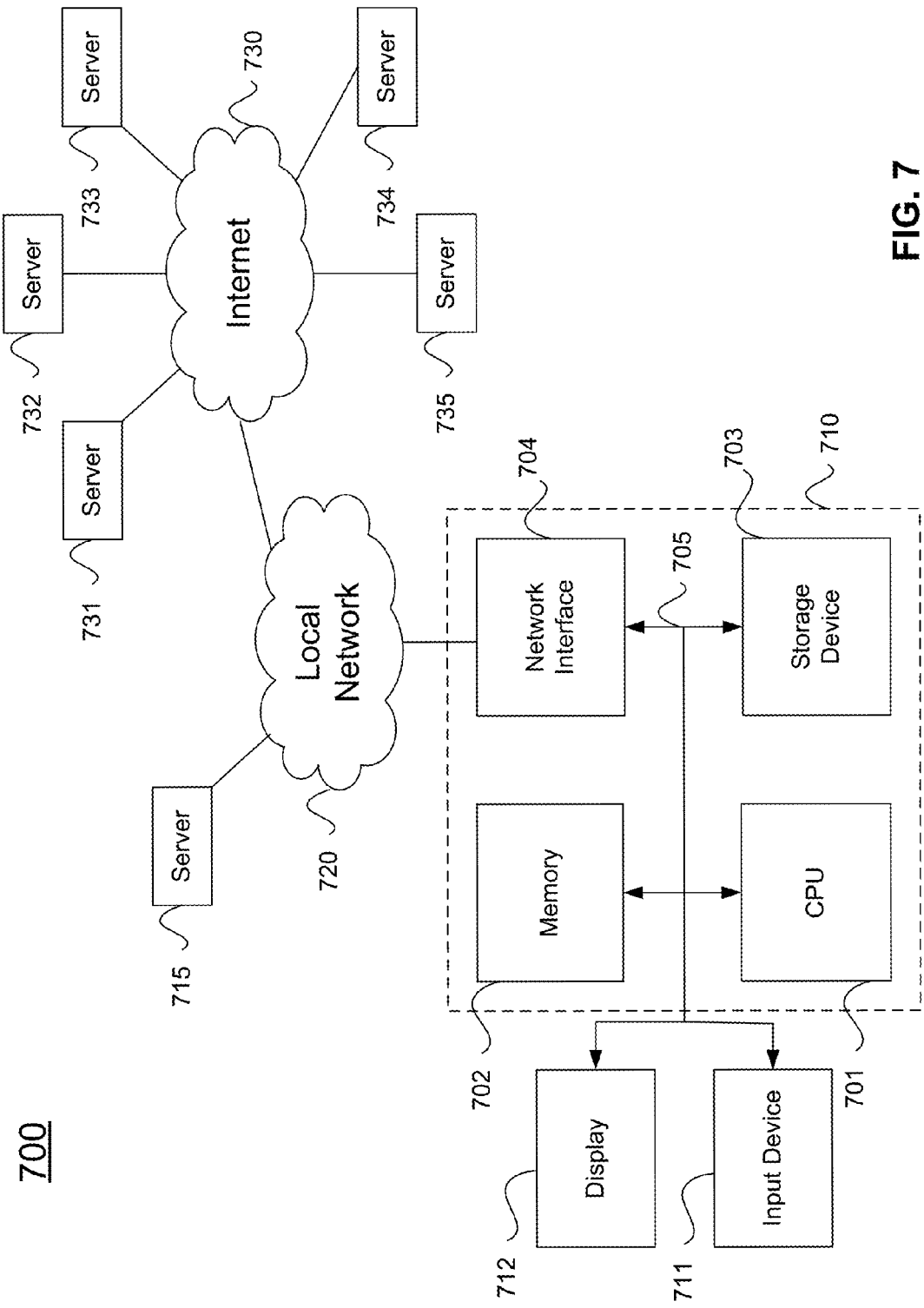
FIG. 7 illustrates an example of a computer system.

An example system 700 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system (710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
   determining, by a processor, that an event has been triggered during execution of a program, wherein the program includes:
   an error context generating an error message in a formatting when a first error is detected during execution of the program and
   an error buffer storing the generated error message;
   executing, by the processor, a first registered event handler associated with the event in response to the determination, wherein the first registered event handler includes:
      a first local error context generating a first local error message when a second error is detected during execution of the first registered event handler and
      a first local error buffer storing the first local error message,
      and wherein the first registered event handler copies the error context to the first local error context during initialization of the first registered event handler so that the formatting is applied to error messages generated during execution of the first registered event handler and error messages generated during execution of the program; and
   merging, by the processor, the first local error buffer into the error buffer.

2. The computer-implemented method of claim 1, wherein merging includes copying the second error message from the first local error buffer to the error buffer.

3. The computer-implemented method of claim 1, further comprising:
   executing, by the processor, a second registered event handler associated with the event in response to the determination, wherein the second registered event handler includes:
      a second local error context generating a second local error message when a third error is detected during execution of the second registered event handler and
      a second local error buffer storing the second local error message,
      wherein the second registered event handler copies the error context to the second local error context during initialization of the second registered event handler so that the formatting is applied to error messages generated during execution of the second registered event handler; and
   merging, by the processor, the second local error buffer into the error buffer.

4. The computer-implemented method of claim 3, wherein the first registered event handler and the second registered event handler are executed on individual threads.

5. The computer-implemented method of claim 4, wherein the first registered event handler and the second registered event handler are executed in parallel.

6. The computer-implemented method of claim 4, wherein the individual threads are synchronized before merging the first local error buffer and the second local error buffer into the error buffer.

7. The computer-implemented method of claim 1, wherein executing the first registered event handler comprises:
   initializing, by the processor, the first local error buffer by copying the contents of the error buffer including the first error message to the first local error buffer.

8. A non-transitory computer readable storage medium storing one or more programs, the one or more programs comprising instructions for:
   determining that an event has been triggered during execution of a program, wherein the program includes:
      an error context generating an error message in a formatting when a first error is detected during execution of the program and an error buffer storing output generated during execution of the program, the error buffer containing a first error message generated during execution of the program;
   executing a first registered event handler associated with the event in response to the determination, wherein the first registered event handler includes:
      a first local error context generating a first local error message when a second error is detected during execution of the first registered event handler and
      a first local error buffer storing the first local error message,
      and wherein the first registered event handler copies the error context to the first local error context during initialization of the first registered event handler so that the formatting is applied to error messages generated during execution of the first registered event handler and error messages generated during execution of the program; and
   merging the first local error buffer into the error buffer.

9. The non-transitory computer readable storage medium of claim 8, wherein merging includes copying the second error message from the first local error buffer to the error buffer.

10. The non-transitory computer readable storage medium of claim 9, further comprising:
executing a second registered event handler associated with the event in response to the determination, wherein the second registered event handler includes:
a second local error context generating a second local error message when a third error is detected during execution of the second registered event handler and
a second local error buffer storing the second local error message,
wherein the second registered event handler copies the error context to the second local error context during initialization of the second registered event handler so that the formatting is applied to error messages generated during execution of the second registered event handler; and
merging the second local error buffer into the error buffer.

11. The non-transitory computer readable storage medium of claim 10, wherein the first registered event handler and the second registered event handler are executed on individual threads.

12. The non-transitory computer readable storage medium of claim 11, wherein the first registered event handler and the second registered event handler are executed in parallel.

13. The non-transitory computer readable storage medium of claim 11, wherein the individual threads are synchronized before merging the first local error buffer and the second local error buffer into the error buffer.

14. The non-transitory computer readable storage medium of claim 8, wherein executing the first registered event handler comprises:
initializing the first local error buffer by copying the first error message of the error buffer to the first local error buffer.

15. A computer implemented system, comprising:
a processor; and
a non-transitory computer readable medium having stored thereon one or more programs, which when executed by the processor, causes the processor to:
determine that an event has been triggered during execution of a program, wherein the program includes: an error context generating an error message in a formatting when a first error is detected during execution of the program and an error buffer storing output generated during execution of the program, the error buffer containing a first error message generated during execution of the program;
execute a first registered event handler associated with the event in response to the determination, wherein the first registered event handler includes:
a first local error context generating a first local error message when a second error is detected during execution of the first registered event handler and
a first local error buffer storing the first local error message,
and wherein the first registered event handler copies the error context to the first local error context during initialization of the first registered event handler so that the formatting is applied to error messages generated during execution of the first registered event handler and error messages generated during execution of the program; and
merge the first local error buffer into the error buffer.

16. The computer-implemented system of claim 15, wherein executing the first registered event handler comprises:
initializing the first local error buffer by copying the first error message of the error buffer over to the first local error buffer.

17. The computer-implemented system of claim 15, wherein the one or more programs, which when executed by the processor, causes the processor to further to:
execute a second registered event handler associated with the event in response to the determination, wherein the second registered event handler includes:
a second local error context generating a second local error message when a third error is detected during execution of the second registered event handler and
a second local error buffer storing the second local error message,
wherein the second registered event handler copies the error context to the second local error context during initialization of the second registered event handler so that the formatting is applied to error messages generated during execution of the second registered event handler; and
merge the second local error buffer into the error buffer.

18. The computer-implemented system of claim 17, wherein the first registered event handler and the second registered event handler are executed on individual threads.

19. The computer-implemented system of claim 17, wherein the first registered event handler and the second registered event handler are executed in parallel.

20. The computer-implemented system of claim 15, wherein executing the first registered event handler comprises initializing the first local error buffer by copying the first error message of the error buffer to the first local error buffer.

* * * * *